(12) United States Patent
Yanagisawa et al.

(10) Patent No.: US 8,285,434 B2
(45) Date of Patent: Oct. 9, 2012

(54) HYBRID-TYPE CONSTRUCTION MACHINE HAVING AN OUTPUT CONDITION CALCULATING UNIT TO CALCULATE OUTPUT CONDITIONS OF AN ENGINE AND AN ELECTRIC STORAGE DEVICE

(75) Inventors: Makoto Yanagisawa, Yokosuka (JP); Keiji Manabe, Yokosuka (JP)

(73) Assignees: Sumitomo Heavy Industries, Ltd., Tokyo (JP); Sumitomo (S.H.I.) Construction Machinery Co., Ltd., Tokyo (JP)

( * ) Notice: Subject to any disclaimer, the term of this patent is extended or adjusted under 35 U.S.C. 154(b) by 155 days.

(21) Appl. No.: 12/810,607

(22) PCT Filed: Dec. 26, 2008

(86) PCT No.: PCT/JP2008/073832
§ 371 (c)(1),
(2), (4) Date: Jun. 25, 2010

(87) PCT Pub. No.: WO2009/084673
PCT Pub. Date: Jul. 9, 2009

(65) Prior Publication Data
US 2010/0280697 A1  Nov. 4, 2010

(30) Foreign Application Priority Data
Dec. 28, 2007 (JP) ................................. 2007-340836

(51) Int. Cl.
*B60L 9/00* (2006.01)

(52) U.S. Cl. ......................................................... 701/22
(58) Field of Classification Search .................. None
See application file for complete search history.

(56) References Cited

U.S. PATENT DOCUMENTS

| | | | |
|---|---|---|---|
| 7,525,206 B2 | 4/2009 | Kagoshima et al. | |
| 2006/0289212 A1* | 12/2006 | Haruhisa | 180/65.2 |
| 2007/0214782 A1 | 9/2007 | Komiyama et al. | |
| 2008/0132379 A1* | 6/2008 | Matsubara et al. | 477/3 |
| 2008/0215214 A1* | 9/2008 | Matsubara et al. | 701/51 |

FOREIGN PATENT DOCUMENTS

| | | |
|---|---|---|
| JP | 2002-322682 | 11/2002 |
| JP | 2005-237178 | 9/2005 |
| JP | 2007-247230 | 9/2007 |

* cited by examiner

*Primary Examiner* — Thomas Tarcza
*Assistant Examiner* — Nagi Murshed
(74) *Attorney, Agent, or Firm* — IPUSA, PLLC

(57) ABSTRACT

In the hybrid-type construction machine, the control unit (60) includes a drive distributing unit (60-8) and an output condition calculating unit (60-9). The output condition calculating unit (60-9) calculates output conditions inclusive of an output setting of the electric storage device determined from a state of charge of the electric storage device (58), an output setting of the engine determined from a number of revolutions of the engine (50), a hydraulic load required value indicative of drive power required by the oil pressure generating unit, and an electric load required value indicative of electric power required by the electric drive unit. The drive distributing unit (60-8) determines output values of the electric drive unit and the hydraulic drive unit based on the calculated output conditions.

6 Claims, 19 Drawing Sheets

FIG.4

OUTPUT POLARITY

| | + | − |
|---|---|---|
| ASSIST MOTOR | ASSIST | POWER GENERATION |
| BATTERY | DISCHARGE | CHARGE |
| ELECTRIC LOAD | POWER RUNNING | REGENERATION |

HYBRID-TYPE CONSTRUCTION MACHINE HAVING AN OUTPUT CONDITION CALCULATING UNIT TO CALCULATE OUTPUT CONDITIONS OF AN ENGINE AND AN ELECTRIC STORAGE DEVICE

TECHNICAL FIELD

The present invention relates to construction machines, and particularly relates to a hybrid-type construction machine that utilizes two power sources to achieve efficient operations.

BACKGROUND ART

Hybrid-type operating machines that utilize an internal combustion power source and an electric motor power source to achieve efficient operations have been developed and put into practical use. As hybrid-type operating machines, those employing a parallel-type drive configuration are known in the field.

In the parallel-type drive configuration, a hydraulic pump and a power machine serving to provide both a power generator function and an electric motor function are connected to an internal combustion engine serving as a shared power source. While the hydraulic pump drives a hydraulic actuator, the power machine exerts a power generator function to charge an electric storage device. Electric power from this electric storage device is used by the power machine to operate as an electric motor to assist the engine. The power machine may be a dual-purpose machine (i.e., a power generator and electric motor machine) that serves to provide both a power generator function and an electric motor function, or may be a power generator and an electric motor that are separately provided.

In such a hybrid-type operating machine, the load on the engine is reduced, and the engine is operated in a highly efficient operating range to achieve energy saving. However, related-art hybrid-type operating machines have problems as follows.

Charge-discharge characteristics of an electric storage device such as a battery (i.e., secondary battery) such as a lithium-ion battery or a capacitor (i.e., electric double layer capacitor) are dependent on the amount of electric charge. As the amount of electric charge decreases, the maximum charge electric power increases, and the maximum discharge electric power decreases. Since a power ratio between the engine and the power machine is determined without regard to the amount of electric charge in the electric storage device, the amount of electric charge may become too large or too small, depending on the condition of load. As a result, the capacity of the electric storage device may not be fully utilized, and, also, the electric storage device may deteriorate.

In order to solve the problems as described above, a power source apparatus for an operating machine has been developed that determines a power ratio between the engine and the power machine in response to the amount of electric charge in the electric storage device, thereby maintaining the amount of electric charge in the electric storage device in a proper range (see Patent Document 1, for example). In this power source apparatus, a hydraulic pump and a power-generator-and-electric-motor dual-purpose machine are connected in parallel to the engine serving as a shared power source. A battery provided as an electric storage device is charged by the power generator function of the power-generator-and-electric-motor dual-purpose machine. Further, power discharged from the battery drives the power-generator-and-electric-motor dual-purpose machine to exert an electric motor function. A power ratio between the engine and the power-generator-and-electric-motor dual-purpose machine is determined based on the power required by the actuator, a selected engine power, and the charge power and discharge power that are selected in response to the amount of battery charge in such a manner as to maintain the amount of battery power in a certain definite range.

[Patent Document 1] Japanese Patent Application Publication No. 2005-237178

DISCLOSURE OF INVENTION

Problem to be Solved by Invention

The technology disclosed in Patent Document 1 described above does not take into account the electric load required by the components of a construction machine. Because of this, regenerative electric power that can be generated by the electric load is not effectively generated. Further, when part of the drive mechanism is electrified and driven by electric power from the battery, the rate of battery charge (SOC: state of charge) may not be maintained in a proper range due to the fact that the output of the electric motor is not taken into account. Since there is no restriction imposed on the engine output, the load on the engine cannot be properly controlled. Due to this, there is a risk of having the engine overloaded, resulting in an engine stall that disrupts continuous operations.

In consideration of the problems described above, it is an object of the present invention to provide a hybrid-type construction machine that can use the battery and engine serving as a power source in a proper output range.

Means to Solve the Problem

In order to achieve the above-noted object, the present invention provides a hybrid-type construction machine, which includes: an oil pressure generating unit to convert an output of an engine into oil pressure for provision to a hydraulic drive unit; a motor generator connected to the engine to serve as both an electric motor and a power generator; an electric storage device to supply electric power to the motor generator to cause the motor generator to function as an electric motor; an electric drive unit driven by electric power supplied from the electric storage device and to generate regenerative electric power for provision to the electric storage device; and a control unit to control an operation of the motor generator, wherein the control unit includes: an output condition calculating unit to calculate output conditions of the engine and the electric storage device; and a drive distributing unit to determine output values of the electric drive unit and the hydraulic drive unit based on the output conditions calculated by the output condition calculating unit.

In the hybrid-type construction machine according to the present invention, the drive distributing unit may generate and output an output instruction for controlling the operation and output of the motor generator based on an output setting of the electric storage device determined from a state of charge of the electric storage device, an output setting of the engine determined from a number of revolutions of the engine, a hydraulic load required value indicative of drive power required by the oil pressure generating unit, and an electric load required value indicative of electric power required by the electric drive unit. Further, the drive distributing unit may determine electric power for a power running operation of the electric drive unit and regenerative electric power generated by a regenerative operation of the electric drive unit based on output limits of the engine and the electric storage device. Moreover, the drive distributing unit may determine an output supplied to the hydraulic drive unit based on output limits of the engine and the electric storage device. Furthermore, an output instruction for the electric storage device may be determined based on comparison between a battery target output and battery required limit values calculated based on outputs of the engine, the electric drive unit, and the electric storage device. Also, an output of the motor generator may be determined based on comparison between the output instruction for the electric storage device and one of electric power supplied to the electric drive unit or electric power output from the electric drive unit.

Advantage of the Invention

According to the present invention, the operation and output of a motor generator are controlled based on the output conditions, so that the electric storage device and engine serving as a power source can be used in a proper output range.

BRIEF DESCRIPTION OF DRAWINGS

FIG. 4 is a drawing illustrating polarities by which the directionality of electric power (motivity) is expressed as output polarity.

Figure 1:
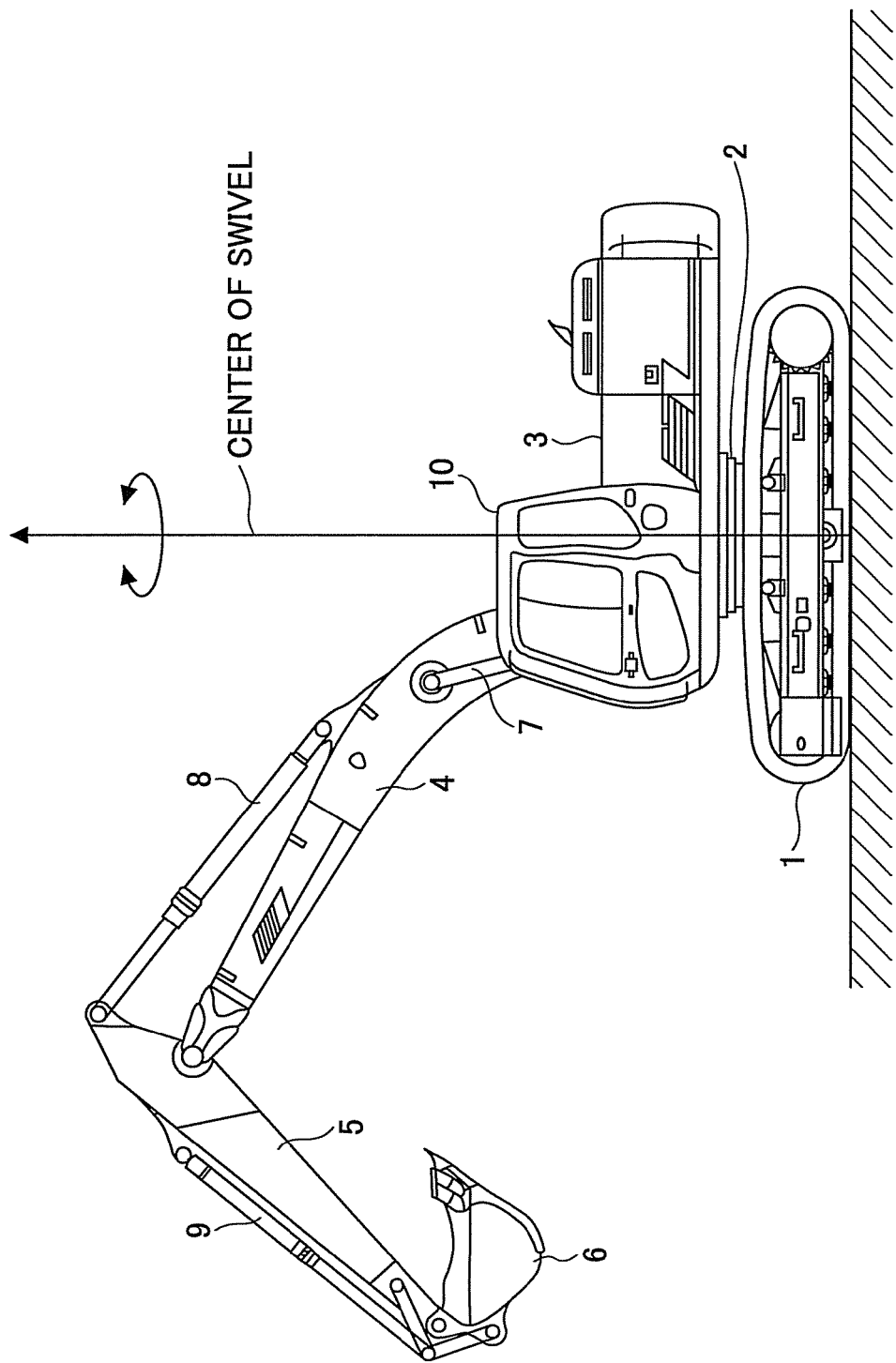
FIG. 1 is a lateral view of a hybrid-type power shovel.

DESCRIPTION OF REFERENCE SYMBOLS 1 base carrier
1A, 1B traveling mechanism
2 swivel mechanism
3 upper rotary section
4 boom
5 arm
6 bucket
7 boom cylinder
8 arm cylinder
9 bucket cylinder
10 cabin
11 engine
12 motor generator
13 reducer
14 main pump
15 pilot pump
16 high-pressure hydraulic line
17 control valve
18 inverter
19 battery
20 inverter
21 swivel-purpose electric motor
23 mechanical brake
24 swivel reducer
25 pilot line
26 operation apparatus
26A, 26B lever
26C pedal
27 hydraulic line
28 hydraulic line
29 pressure sensor
30 controller
31 speed instruction conversion unit
32 drive control device
40 swivel drive control device
50 engine
52 assist motor
54 hydraulic load
56 electric load
58 battery
60 control unit
60-1 through 60-7 block
60-8 block (drive distributing unit)
60-9 output condition calculating unit

BEST MODE FOR CARRYING OUT THE INVENTION

In the following, embodiments of the present invention will be described with reference to the accompanying drawings.

First, a description will be given of a hybrid-type power shovel as an example of a hybrid-type construction machine to which the present invention is applied.

FIG. 1 is a lateral view of a hybrid-type power shovel. A base carrier 1 of the power shovel has an upper rotary section 3 mounted thereon through a swivel mechanism 2. A boom 4 extends from the upper rotary section 3, and has an arm 5 attached to one end thereof. Further, a bucket 6 is attached to the tip of the arm 5. The boom 4, the arm 5, and the bucket 6 are hydraulically-powered by a boom cylinder 7, an arm cylinder 8, and a bucket cylinder 9, respectively. The upper rotary section has a cabin 10 and a power source (not illustrated).

Figure 2:
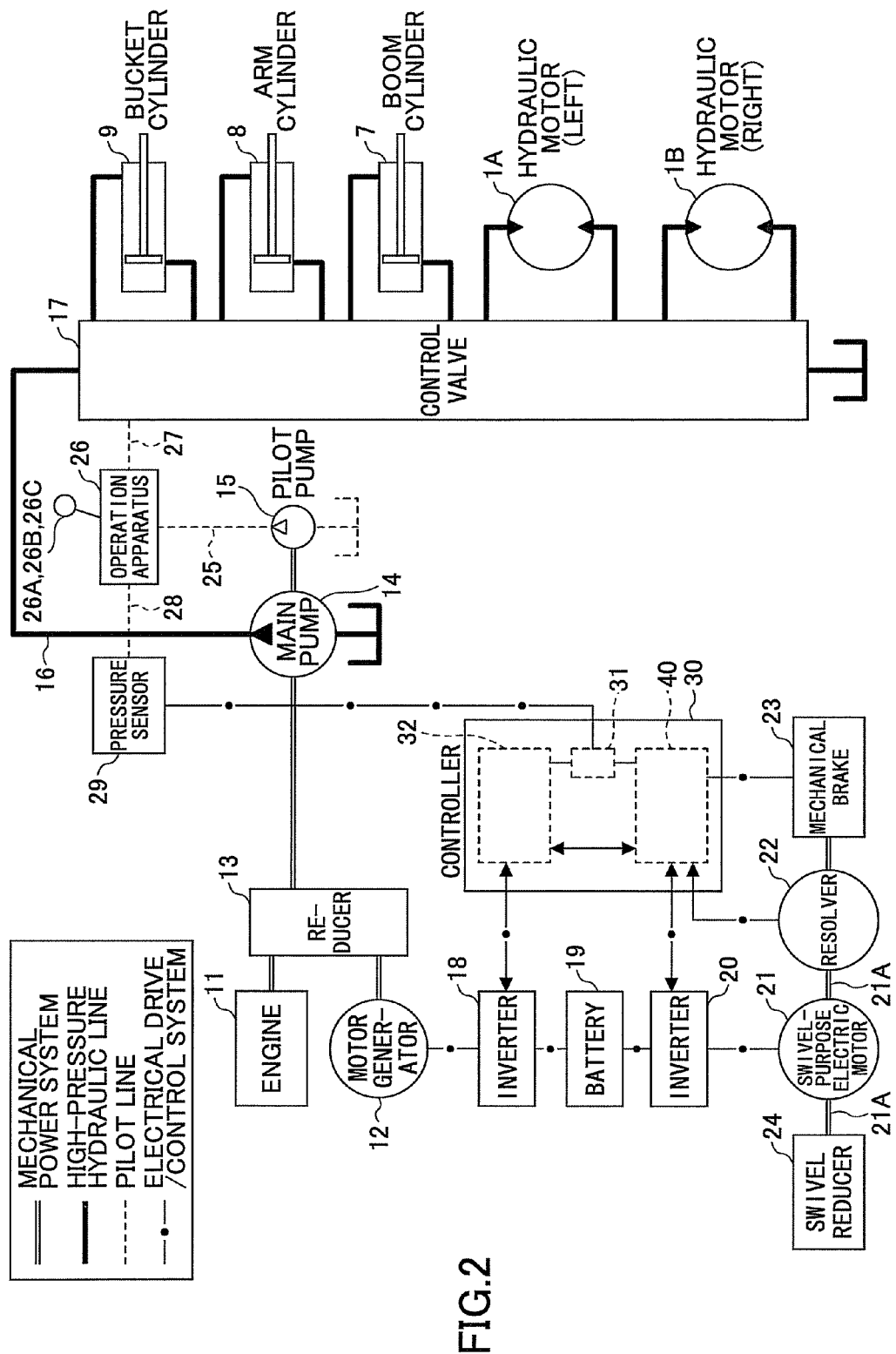
FIG. 2 is a block diagram illustrating the configuration of a drive mechanism of the power shovel illustrated in FIG. 1.

FIG. 2 is a block diagram illustrating the configuration of a drive mechanism of the power shovel illustrated in FIG. 1. In FIG. 2, a mechanical power system is illustrated by double lines, high-pressure hydraulic lines illustrated by solid lines, pilot lines illustrated by dotted lines, and electrical drive and control systems illustrated by chain lines.

An engine 11 serving as a mechanical drive unit and a motor generator 12 serving as an assist drive unit are both connected to the input shafts of a reducer 13 serving as a power booster. The output shaft of the reducer 13 is connected to a main pump and a pilot pump 15. A control valve 17 is connected to the main pump 14 via a high-pressure hydraulic line 16.

The control valve 17 is a control device that controls the hydraulic system. The control valve 17 is connected to hydraulic motors 1A (for the right-hand side) and 1B (for the left-hand side) for the base carrier 1, the boom cylinder 7, the arm cylinder 8, and the bucket cylinder 9, respectively, through high-pressure hydraulic lines.

The motor generator 12 is connected to a battery 19 serving as an electric storage device via an inverter 18. The battery 19 is connected to a swivel-purpose electric motor 21 via an inverter 20. The swivel-purpose electric motor 21 is an electric load of the power shovel. A rotary shaft 21A of the swivel-purpose electric motor 21 is connected to a resolver 22, a mechanical brake 23, and a swivel reducer 24. The pilot pump 15 is connected to an operation apparatus 26 via a pilot line 25. The operation apparatus 26 is connected to the control valve 17 and a pressure sensor 29 serving as a lever-operation detecting unit via hydraulic lines 27 and 28, respectively. The pressure sensor 29 is connected to a controller 30 that performs drive control with respect to the electric system.

The power shovel having the above-described configuration is a hybrid-type construction machine having the engine 11, the motor generator 12, and the swivel-purpose electric motor 21 as power sources. These power sources are mounted in the upper rotary section 3 illustrated in FIG. 1. In the following, a description will be given of each part.

The engine 11 is an internal combustion engine implemented as a diesel engine, for example, and has an output shaft thereof connected to one of the input shafts of the reducer 13. The engine 11 is kept running during the operation of the construction machine.

The motor generator 12 may be an electric motor that can perform both a power running operation and a regenerative operation. In this example, an AC-drive motor generator powered by the inverter 20 is used as the motor generator 12. The motor generator 12 may be implemented as an IPM (Interior Permanent Magnet) motor in which a magnet is embedded in the rotor, for example. The rotation shaft of the motor generator 12 is connected to the remaining one of the input shafts of the reducer 13.

The reducer 13 has two input shafts and one output shaft. The two input shafts are connected to the power shaft of the engine 11 and the power shaft of the motor generator 12, respectively. The output shaft is connected to the power shaft of the main pump 14. When the load of the engine 11 is heavy, the motor generator 12 performs a power running operation. The drive power of the motor generator 12 is transmitted to the main pump 14 through the output shaft of the reducer 13. This assists the driving of the engine 11. When the load of the engine 11 is light, the drive power of the engine 11 is transmitted to the motor generator 12 via the reducer 13, so that the motor generator 12 generates electric power through a regenerative operation. Switching between the power running operation and regenerative operation of the motor generator 12 is performed by the controller 30 in response to the load of the engine 11 and the like.

The main pump 14 is a hydraulic pump that generates oil pressure for provision to the control valve 17. The oil pressure generated by the main pump 14 is supplied through the control valve 17 to the hydraulic motors 1A and 1B, the boom cylinder 7, the arm cylinder 8, and the bucket cylinder 9, respectively, in order to drive these hydraulic loads. The pilot pump 15 is a pump that generates pilot pressure for the hydraulic operation system.

The control valve 17 is an oil-pressure control apparatus that controls, in response to input operations performed by the driver, the oil pressure supplied to the hydraulic motors 1A and 1B of the base carrier 1, the boom cylinder 7, the arm cylinder 8, and the bucket cylinder 9 connected through the high-pressure hydraulic lines.

The inverter 18 is situated between the motor generator 12 and the battery 19 as previously described, and controls the operation of the motor generator 12 in response to instruction from the controller 30. With this arrangement, required electric power is supplied from the battery 19 to the motor generator 12 when the inverter 18 controls the power running of the motor generator 12. Further, the electric power generated by the motor generator 12 is stored in the battery 19 when the inverter 18 controls the regenerative operation of the motor generator 12.

The battery 19 serving as an electric storage device is situated between the inverter 18 and the inverter 20. With this arrangement, the electric power required for the running operation is supplied when at least one of the motor generator 12 and the swivel-purpose electric motor 21 performs a power running operation. When at least one of the motor generator 12 and the swivel-purpose electric motor 21 performs a regenerative operation, the regenerative electric power generated by the regenerative operation is stored as electric energy.

The inverter 20 is situated between the swivel-purpose electric motor 21 and the battery 19 as previously described, and controls the operation of the swivel-purpose electric motor 21 in response to instruction from the controller 30. With this arrangement, required electric power is supplied from the battery 19 to the swivel-purpose electric motor 21 when the swivel-purpose electric motor 21 performs a power running operation. Further, the electric power generated by the swivel-purpose electric motor 21 is stored in the battery 19 when the swivel-purpose electric motor 21 performs a regenerative operation.

The motor generator 21 may be an electric motor that can perform both a power running operation and a regenerative operation, and is provided for the purpose of driving the swivel mechanism 2 of the upper rotary section 3. During a power running operation, the rotational force of rotation of the swivel-purpose electric motor 21 is amplified by the swivel reducer 24, so that the upper rotary section 3 rotates through controlled acceleration and deceleration. Further, regenerative electric power is generated by the inertial rotation of the upper rotary section 3 while the rotation rate is increased by the swivel reducer 24 for provision to the swivel-purpose electric motor 21. In this example, an AC-drive motor generator driven by the inverter 20 through a PWM (pulse width modulation) control signal is used as the swivel-purpose electric motor 21. The swivel-purpose electric motor 21 may be implemented as a magnet-embedded-type IPM motor. This configuration can generate a large induced electromotive force, so that the electric power generated by the swivel-purpose electric motor 21 during regeneration can be increased.

The control of charging and discharging of the battery 19 is performed by the controller 30 based on the state of charge of the battery 19, the state of operation of the motor generator 12 (i.e., power running operation or regenerative operation), and the state of operation of the swivel-purpose electric motor 21 (i.e., power running operation or regenerative operation).

The resolver 22 is a sensor that detects the rotational position and rotational angle of the rotary shaft 21A of the swivel-purpose electric motor 21. The resolver 22 is mechanically connected to the swivel-purpose electric motor 21 to detect a difference between the rotational position of the rotary shaft 21A prior to rotation and the rotational position thereof after a counterclockwise or clockwise rotation, thereby detecting the rotational angle and rotation direction of the rotary shaft 21A. The rotational angle and rotation direction of the swivel mechanism 2 are derived from the detected rotational angle of the rotary shaft 21A of the swivel-purpose electric motor 21.

The mechanical brake 23 is a brake mechanism that generates a mechanical braking force to mechanically stop the rotary shaft 21A of the swivel-purpose electric motor 21. The braking and releasing of the mechanical brake 23 is switched over by an electromagnetic switch. Switching is performed by the controller 30.

The swivel reducer 24 is a reducer that reduces the rotation rate of the rotary shaft 21A of the swivel-purpose electric motor 21 for mechanical transmission to the swivel mechanism 2. With this arrangement, during a power running operation, the rotational force of the swivel-purpose electric motor 21 is increased, thereby providing an increased rotational force to the rotary section. During a regenerative operation, on the other hand, the rotation rate of rotation of the rotary section is increased, thereby causing the swivel-purpose electric motor 21 to perform an increased number of rotational actions.

The swivel mechanism 2 can rotate when the mechanical brake 23 for the swivel-purpose electric motor 21 is in the released state. The upper rotary section 3 rotates counterclockwise or clockwise.

The operation apparatus 26 is an input device used by a driver of the power shovel to operate the swivel-purpose electric motor 21, the base carrier 1, the boom 4, the arm 5, and the bucket 6. The operation apparatus 26 includes levers 26A and 26B and a pedal 26C. The lever 26A is used for operating the swivel-purpose electric motor 21 and the arm 5, and is situated near the driver's seat in the upper rotary section 3. The lever 26B is used for operating the boom 4 and the bucket 6, and is situated near the driver's seat. The pedal 26C includes a pair of pedals for operating the base carrier 1, and are situated in the leg room of the driver's seat.

The operation apparatus 26 converts an oil pressure (i.e., primary-side oil pressure) supplied through the pilot line 25 into an output oil pressure (i.e., secondary-side oil pressure) responsive to the amount of movement operation by the driver. The secondary-side oil pressure output from the operation apparatus 26 is supplied to the control valve 17 through the hydraulic line 27, and, also, is detected by the pressure sensor 29.

Upon operations of the levers 26A and 26B and the pedal 26C, the control valve 17 is driven through the hydraulic line 27, thereby controlling oil pressures inside the hydraulic motors 1A and 1B, the boom cylinder 7, the arm cylinder 8, and the bucket cylinder 9. The base carrier 1, the boom 4, the arm 5, and the bucket 6 are thus driven.

For operation purposes, the hydraulic line includes one line for each of the hydraulic motors 1A and 1B (i.e., two lines in total) and two lines for each of the boom cylinder 7, the arm cylinder 8, and the bucket cylinder 9 (i.e., 6 lines in total). Namely, there are 8 lines in total. For the sake of convenience of explanation, however, the hydraulic line 27 is illustrated and described as a single consolidated line.

The pressure sensor 29 serving as a lever operation detecting unit detects a change in the oil pressure inside the hydraulic line 28 caused by an operation of the lever 26A. The pressure sensor 29 outputs an electric signal indicative of the oil pressure inside the hydraulic line 28. This electric signal is applied to the controller 30. This arrangement makes it possible to properly detect the amount of movement operation performed on the lever 26A. A pressure sensor is used as a lever operation detecting unit in the present embodiment. Notwithstanding this, a sensor that detects the amount of movement operation performed on the lever 26A directly by an electric signal may be used.

The controller 30 is a control apparatus that controls the driving of the power shovel, and includes a speed instruction conversion unit 31, a drive control device 32, and a swivel drive control device 40. The controller 30 is implemented as an arithmetic processing device inclusive of a CPU (Central Processing Unit) and an internal memory. The speed instruction conversion unit 31, the drive control device 32, and the swivel drive control device 40 are implemented by the CPU of the controller 30 executing drive-control-purpose programs stored in the internal memory.

The speed instruction conversion unit 31 is an arithmetic processing unit that converts a signal supplied from the pressure sensor 29 into a speed instruction. With this arrangement, the amount of movement operation performed on the lever 26A is converted into a speed instruction (rad/s) for rotating the swivel-purpose electric motor 21. This speed instruction is applied to the drive control device 32 and the swivel drive control device 40.

In the following, a description will be given of the drive control of a hybrid-type construction machine according to an embodiment of the present invention by taking the drive control of the above-described power shovel as an example.

Figure 3:
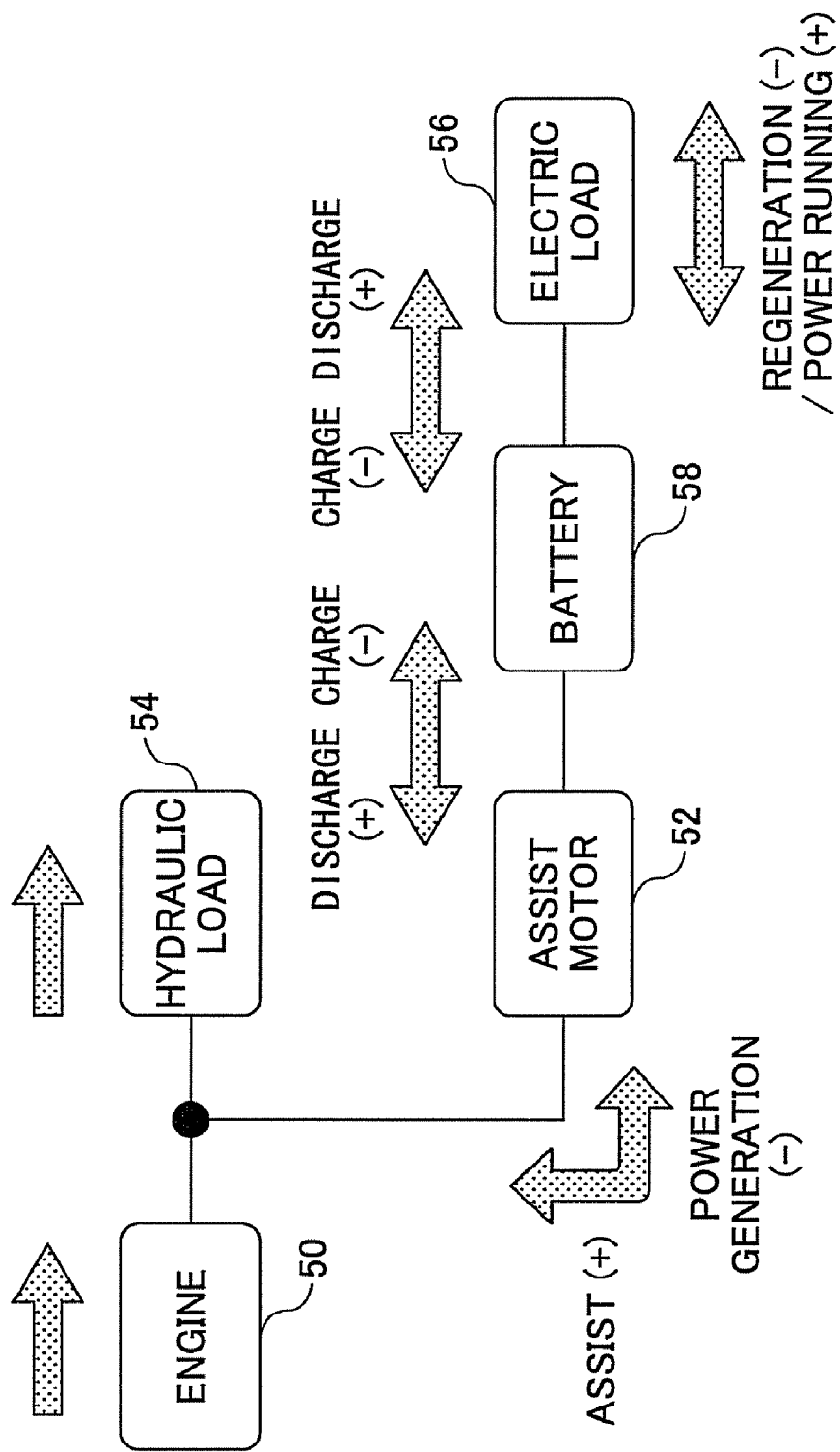
FIG. 3 is a drawing illustrating a model of the power system of the power shovel illustrated in FIG. 1.

FIG. 3 is a drawing illustrating a model of the power system of the power shovel. In the model charge illustrated in FIG. 3, an engine 50 corresponds to the engine 11 described above, and an assist motor 52 corresponds to the motor generator 12 that has both the electric motor function and the power generator function. A hydraulic load 54 corresponds to components that are hydraulically-driven, and includes the boom cylinder 7, the arm cylinder 8, the bucket cylinder 9, and the hydraulic motors 1A and 1B described above. The hydraulic load 54 may be regarded as a load for generating oil pressure. In such a case, the hydraulic load 54 may correspond to the main pump 14 serving as a hydraulic pump for generating oil pressure. An electric load 56 corresponds to components that are driven by electric power such as electric motors and electric actuators, and includes the swivel-purpose electric motor 21. A battery 58 is an electric storage device, and corresponds to the battery 19 described above. In this embodiment, a capacitor (electric double layer capacitor) is used as the battery 58.

The hydraulic load 54 receives oil pressure generated by the hydraulic pump (i.e., main pump 14 described above) for generating oil pressure. The engine 50 provides power to drive the hydraulic pump. Namely, the power generated by the engine 50 is converted into oil pressure by the hydraulic pump for provision to the hydraulic load 54.

Further, the assist motor 52 is also connected to the hydraulic pump. The power generated by the assist motor 52 may be supplied to the hydraulic pump to drive it. Namely, the electric power supplied to the assist motor 52 is converted by the assist motor 52 into drive power, which is then converted by the hydraulic pump into oil pressure for provision to the hydraulic load 54. In so doing, the assist motor functions as an electric motor.

The electric load 56 receives electric power from the battery 58 to operate. The state in which the electric load 56 is being driven is referred to as a power running operation. The electric load 56 is a device such as an electric-motor-and-power-generator dual-purpose machine that can generate regenerative electric power. The regenerative electric power is supplied to the battery 58 for storage therein, or is supplied to the assist motor 52 as the electric power for driving the assist motor 52.

The battery 58 is charged by the regenerative electric power from the electric load 56 as described above. When the assist motor 52 functions as a power generator receiving power from the engine 50, the electric power generated by the assist motor 52 may be supplied to the battery 58 for storage therein. The electric power generated by the assist motor 52 may be directly supplied to the electric load 56 to drive the electric load 56.

When attention is focused on the part that relates to electric power in the above-described configuration, it is understood that the movement of electric power (drive power) has directionality. When this directionality is represented as output polarity, polarities as illustrated in FIG. 4 are obtained.

With respect to the assist motor 52, electric power is output as drive power when the assist motor 52 assists the engine 50 to generate oil pressure to supply drive power to the hydraulic load 54. The output polarity of the assist motor 52 in this state is regarded as (+) polarity. When the drive power of the engine 50 drives the assist motor 52 to generate electric power, the drive power is input into the assist motor 52. The output polarity of the assist motor 52 in this state is regarded as (−) polarity.

With respect to the battery 58, its output polarity is regarded as (+) polarity when the battery 58 discharges to drive the electric load 56 or the assist motor 52. There are also cases in which the battery 58 is charged by the regenerative electric power from the electric load 56 or by the electric power generated by the assist motor 52. The output polarity of the battery 58 in this state is regarded as (−) polarity.

With respect to the electric load 56, its output polarity is regarded as (+) polarity when the electric load 56 is driven by received electric power to perform a power running operation. Its output polarity is regarded as (−) polarity when the electric load 56 generates regenerative electric power.

In the hybrid-type power shovel as described above, attention is focused on the components relating to electric power, so that the operation state of the assist motor 52 and the electric load 56 and the charge state of the battery 58 are taken into account to adjust the output polarity of these devices for the purpose of determining operating conditions. Especially, in order to achieve a state in which the battery 58 is always kept at a proper charge level, it is important that the output polarity of the assist motor 52 be adjusted to control a ratio between the output to the hydraulic load 54 and the output to the electric load 56.

Inputs regarding control include the following four parameters.

1) Actual Engine Revolution Nact

The actual engine revolution Nact is a parameter that indicates the number of actual revolutions of the engine 50. The engine 50 is kept running all the time during the operation of the power shovel. The actual engine revolution Nact is detected all the time.

2) Hydraulic Load Required Output Phydreq

The hydraulic load required output Phydreq is a parameter that indicates the drive power required by the hydraulic load 54, and may correspond to the amount of movement operation performed on the operation lever operated by the driver of the power shovel, for example.

3) Electric Load Required Output Pelcreq

The electric load required output Pelcreq is a parameter that indicates the electric power required by the electric load 56, and may correspond to the amount of movement operation performed on the operation lever operated by the driver of the power shovel, for example.

4) Battery Voltage Vact

The battery voltage Vact is a parameter that indicates the output voltage of the battery 58. In this embodiment, a capacitor storage device is used as the battery. The amount of electric charge in a capacitor is proportional to the square of the voltage across the terminals of the capacitor. The state of charge (i.e., SOC) of the battery 58 can be detected by detecting the output voltage.

Based on the four parameters described above, the outputs as follows are controlled to achieve optimum operating conditions.

1) Hydraulic Load Actual Output Phydout

The hydraulic load actual output Phydout is the drive power actually supplied to the hydraulic load 54 in response to the hydraulic load required output Phydreq. If the drive power as required by the hydraulic load required output Phydreq is supplied all the time, there may be cases in which the need of the simultaneously operating electric load 56 is not satisfied or in which the state of charge SOC of the battery 58 cannot be maintained within a proper range. In some cases, therefore, some limits may have to be placed on the drive power that is actually supplied to the hydraulic load 54.

2) Electric Load Actual Output Pelcout

The electric load actual output Pelcout is the electric power actually supplied to the electric load 54 in response to the electric load required output Pelcreq. If the electric power as required by the electric load required output Pelcreq is supplied all the time, there may be cases in which the need of the simultaneously operating hydraulic load 54 is not satisfied or in which the state of charge SOC of the battery 58 cannot be maintained within a proper range. In some cases, therefore, some limits may have to be placed on the electric power that is actually supplied to the electric load 56.

3) Assist Motor Output Instruction Pasmref

The assist motor output instruction Pasmref is a value that specifies the output of the assist motor 52. The assist motor output instruction Pasmref specifies whether the assist motor 52 operates as an electric motor to assist the engine 50 to supply drive power to the hydraulic load 54, or operates as a power generator to supply electric power to the electric load 56 or to charge the battery 58.

In the present embodiment, the drive control device 32 included in the controller 30 controls the hydraulic load actual output Phydout, the electric load actual output Pelcout, and the assist motor output instruction Pasmref based on the actual engine revolution Nact, the hydraulic load required output Phydreq, the electric load required output Pelcreq, and the battery voltage Vact. In the following, the drive control device 32 will be referred to as a control unit 60 for the sake of convenience.

Figure 5:
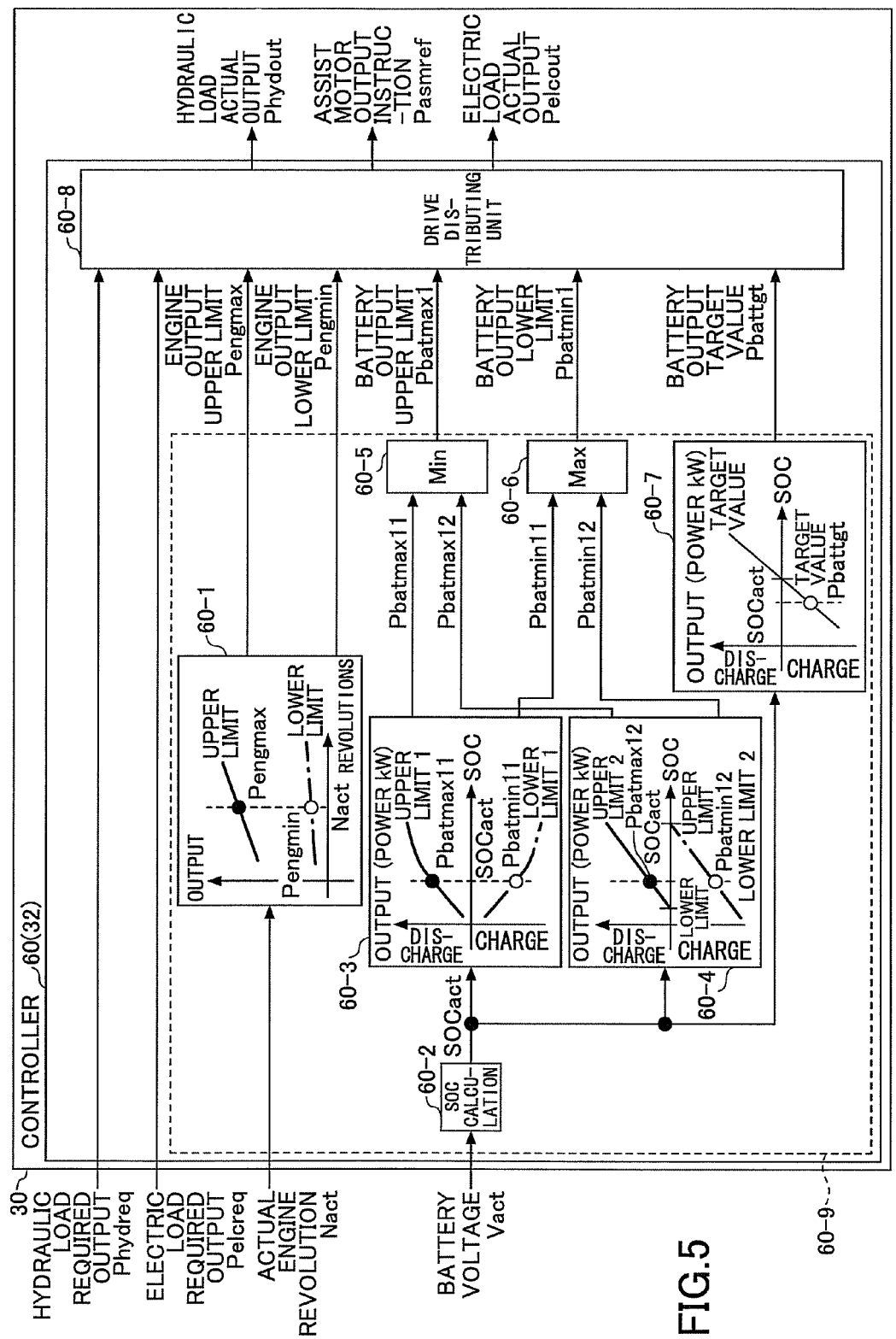
FIG. 5 is a functional block diagram of a control unit included in the controller for performing control according to an embodiment of the present invention.

FIG. 5 is a functional block diagram of the control unit 60 included in the controller 30 for performing the above-described control. The outline of control functions of the control unit 60 will be described with reference to FIG. 5.

The control unit 60 includes an output condition calculating unit 60-9 and a drive distributing unit 60-8. The output condition calculating unit 60-9 includes blocks 60-1 through 60-7 to calculate upper and lower limits that define the output conditions of the engine 50 and the battery 58.

The actual engine revolution Nact applied to the output condition calculating unit 60-9 of the control unit 60 is input into the block 60-1. The block 60-1 determines an output upper limit Pengmax and an output lower limit Pengmin with respect to the received actual engine revolution Nact for provision to the block 60-8 that is the drive distributing unit. The block 60-1 has a map or conversion table that specifies an upper limit and a lower limit of the output in relation to the number of revolutions of the engine 50 as illustrated in FIG. 5. Referring to the map or conversion table, the block 60-1 determines the output upper limit Pengmax and the output lower limit Pengmin with respect to the received actual engine revolution Nact. This map or conversion table is created in advance and stored in the memory of the controller 30. Instead of using such a map or conversion table, the upper limit Pengmax and the lower limit Pengmin may be obtained by substituting the actual engine revolution Nact into a formula that represents an upper limit and a lower limit.

The hydraulic load required output Phydreq and the electric load required output Pelcreq applied to the control unit 60 are input into the block 60-8 that is the drive distributing unit.

The battery voltage Vact applied to the output condition calculating unit 60-9 of the control unit 60 is input into the block 60-2. The block 60-2 obtains the current state of charge SOCact of the battery 58 from the received battery voltage Vact. The current state of charge SOCact is output to the blocks 60-3, 60-4, and 60-7. In the present embodiment, a capacitor is used as the battery 58. The state of charge SOC can be easily calculated from the measured battery voltage (i.e., the voltage across the terminals of the capacitor).

Based on the current state of charge SOCact and a predetermined maximum charge-discharge current (i.e., certain definite current), the block 60-3 obtains a maximum value of discharge electric power that can be discharged at the present time (i.e., battery output upper limit Pbatmax11) and a maximum value of charge electric power that can be charged at the present time (i.e., battery output lower limit Pbatmin11). The block 60-3 has a map or conversion table that specifies a maximum charge electric power [kW] and a maximum discharge electric power [kW] that are possible to be charged or discharged by use of a certain definite electric current with respect to various values of the state of charge SOC as illustrated in FIG. 5.

Namely, the map illustrated in the block 60-3 represents the electric power (i.e., "maximum charge-discharge electric current"דcapacitor voltage") that is determined for a maximum charge-discharge electric current that flows as determined by the capacity of the converter and capacitor with respect to a given value of the state of charge SOC. The state of charge SOC is proportional to the square of a charge-discharge voltage (i.e., capacitor voltage). The maximum charge electric power and the maximum discharge electric power illustrated in the block 60-3 thus form a parabola.

In the manner described above, the block 60-3 refers to the map or conversion table to obtain the maximum charge electric power (i.e., battery output upper limit Pbatmax11) and the maximum discharge electric power (i.e., battery output lower limit Pbatmin11) that are allowable under the condition of using a certain definite current with respect to the current state of charge SOCact. The obtained maximum discharge electric power (i.e., battery output upper limit Pbatmax11) is output to the block 60-5, and the obtained maximum charge electric power (i.e., battery output lower limit Pbatmin11) is output to the block 60-6.

Based on the current state of charge SOCact and a predetermined SOC lower limit and SOC upper limit, the block 60-4 obtains a maximum value of discharge electric power that can be discharged at the present time (i.e., battery output upper limit Pbatmax12) and a maximum value of charge electric power that can be charged at the present time (i.e., battery output lower limit Pbatmin12). The block 60-4 has a map or conversion table that specifies a maximum discharge electric power [kW] and a maximum charge electric power [kW] for ensuring that the state of charge SOC is not to drop below the SOC lower limit and not to rise above the SOC upper limit as illustrated in FIG. 5

Namely, the map illustrated in the block 60-4 specifies a charge-discharge electric power that is proper for a given state of charge SOC. In the map illustrated in the block 60-4, the lower limit is equal to the state of charge SOC that is selected in order to provide a margin that prevents the state of charge from becoming zero. If the state of charge SOC drops to zero or close to zero, it becomes impossible to discharge immediately upon a discharge request. It is thus desirable to keep the battery state that is charged to a certain level. To this end, the lower limit (e.g., 30%) is set for the state of charge SOC, so that no discharge is performed when the state of charge SOC is lower than the lower limit. Accordingly, the maximum discharge electric power (i.e., maximum dischargeable electric power) is zero (i.e., no discharge) at the lower limit of the state of charge SOC. The maximum discharge electric power increases as the state of charge SOC increases because there is an increasing margin for the dischargeable electric power. In the map illustrated in the block 60-4, the maximum discharge electric power linearly increases from the upper limit of the state of charge SOC. An increase is not limited to such a linear increase, but may form a parabola line. Any desired increase pattern may be selected.

When regenerative electric power is generated by the electric load under the condition of the state of charge SOC being 100%, the electric storage device cannot immediately absorb the regenerative electric power. In consideration of this, the upper limit (e.g., 90%) is set such that the state of charge SOC does not become 100%. Control is performed such that no charge is made if the state of charge SOC is higher than the upper limit. Accordingly, the maximum charge electric power (i.e., maximum chargeable electric power) is zero (i.e., no charge) at the upper limit of the state of charge SOC. The maximum charge electric power increases as the state of charge SOC decreases because there is an increasing margin for the chargeable electric power. In the map illustrated in the block 60-4, the maximum charge electric power linearly increases from the upper limit of the state of charge SOC. An increase is not limited to such a linear increase, but may form a parabola line. Any desired increase pattern may be selected.

In the manner described above, the block 60-4 refers to the map or conversion table to obtain the maximum discharge electric power (i.e., battery output upper limit Pbatmax12) and the maximum charge electric power (i.e., battery output lower limit Pbatmin12) that are allowable with respect to the current state of charge SOCact. The obtained maximum discharge electric power (i.e., battery output upper limit Pbatmax12) is output to the block 60-5, and the obtained maximum charge electric power (i.e., battery output lower limit Pbatmin12) is output to the block 60-6.

The block 60-5 selects the battery output upper limit Pbatmax1 that is the smaller of the battery output upper limit Pbatmax11 supplied from the block 60-3 or the battery output upper limit Pbatmax12 supplied from the block 60-4, and outputs the selected one to the drive distributing unit block 60-8. The block 60-5 functions as a minimum-value selector.

The block 60-6 selects the battery output lower limit Pbatmin1 that is the larger of the battery output lower limit Pbatmin11 supplied from the block 60-3 or the battery output lower limit Pbatmin1 2 supplied from the block 60-4, and outputs the selected one to the drive distributing unit block 60-8. The battery output value that is negative indicates charging. The larger battery output lower limit is the one that has a smaller negative value, i.e., the one that is closer to zero. With this arrangement, the battery 19 is reliably protected from excessive charging or discharging that exceeds its output capacity. The block 60-6 functions as a maximum-value selector.

In the manner described above, the maximum electric power that can be charged or discharged is obtained in response to the current state of charge of the battery 58.

The block 60-7 obtains a battery output target value Pbattgt for bringing the state of charge SOC closer to a target value based on the current state of charge SOCact and a predetermined SOC target value. The block 60-7 has a map or conversion table that specifies the battery output target value Pbattgt for bringing the state of charge SOC closer to the SOC target value with respect to various values of the state of charge SOC as illustrated in FIG. 5. The block 60-7 refers to the map or conversion table to obtain charge electric power indicative of the amount of required charge electric power or discharge electric power indicative of the amount of required discharge electric power, which were required to set the state of charge SOC to the optimum target value.

On the vertical axis of the map referred to by the block 60-7, a zero output value coincides with the state in which neither charging nor discharging is performed. Charging corresponds to the negative side on the axis, and discharging corresponds to the positive side on the axis. In the example illustrated in FIG. 5, the current state of charge SOCact is smaller than the target value, so that the battery 58 needs to be charged. The battery output target value Pbattgt thus indicates a target value indicative of power charging. The battery output target value Pbattgt that is positive indicates a target value indicative of power discharging, and the value that is negative indicates a target value indicative of power charging. The battery output target value Pbattgt obtained by the block 60-7 is output to the drive distributing unit block 60-8.

As described above, the block 60-8 that is the drive distributing unit receives the engine output upper limit Pengmax and the engine output lower limit Pengmin serving as engine output limits, the battery output upper limit Pbatmax1 and the battery output lower limit Pbatmin1 serving as battery output limits, and the battery output target value Pbattgt. Based on these received values, the block 60-8 determines the hydraulic load actual output Phydout, the electric load actual output Pelcout, and the assist motor output instruction Pasmref for provision to each part of the controller 30.

The controller 30 controls the oil pressure supplied to the hydraulic load 54 based on the hydraulic load actual output Phydout, controls the electric power supplied to the electric load 56 based on the electric load actual output Pelcout, and controls the assist amount of the assist motor 52 for the engine 50 or the power generation amount of the assist motor 52 based on the assist motor output instruction Pasmref.

Figure 6:
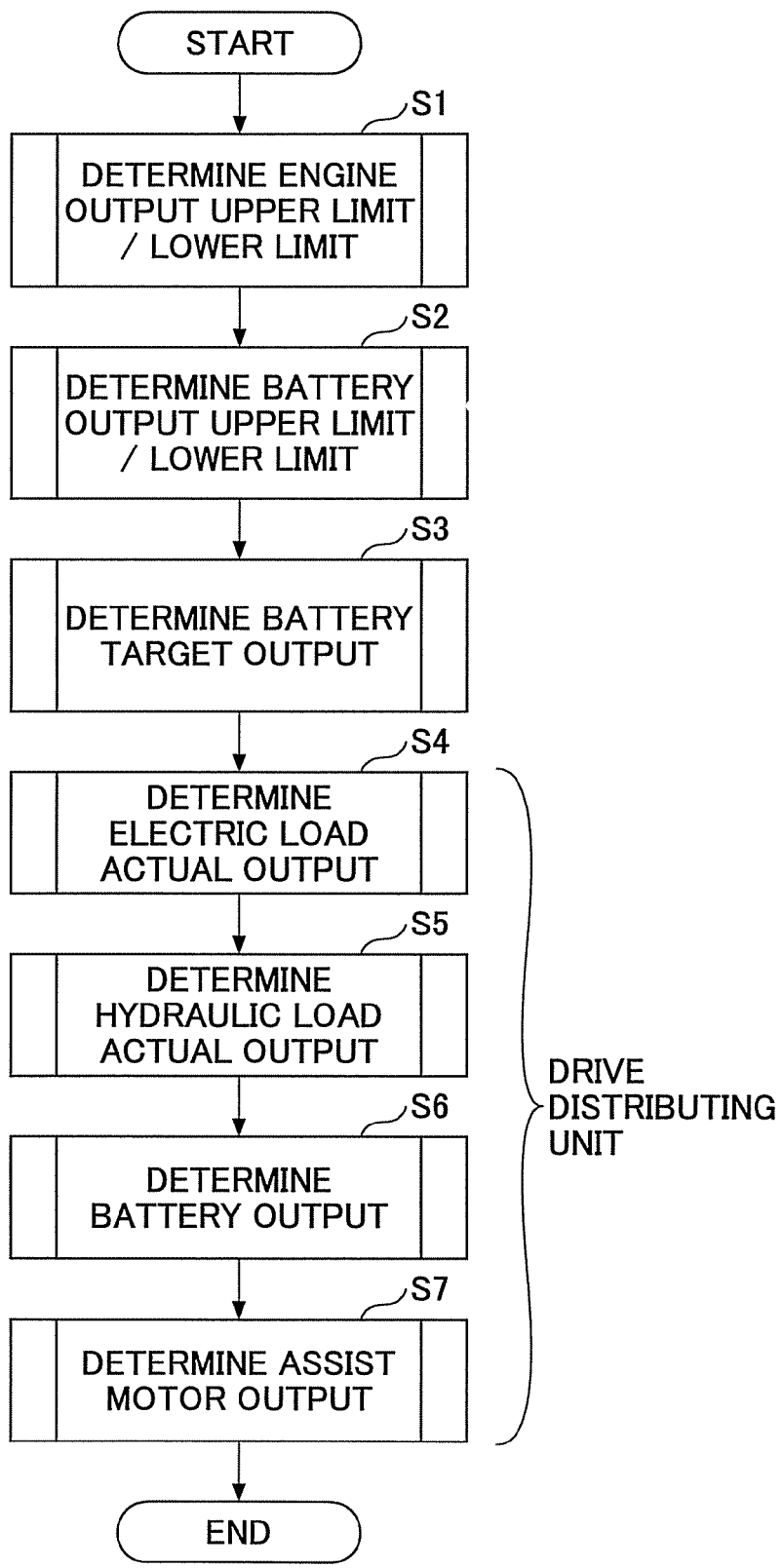
FIG. 6 is a flowchart of the process performed by the drive control unit illustrated in FIG. 5.

In the following, a description will be given of the process of determining the hydraulic load actual output Phydout, the electric load actual output Pelcout, and the assist motor output instruction Pasmref at the control unit 60. FIG. 6 is a flowchart of the process performed by the control unit 60.

In step S1, the map or conversion table is used to determine the engine output upper limit Pengmax and engine output lower limit Pengmin of the engine 50 in the current state from the actual engine revolution Nact indicative of the number of revolutions of the engine 50 in the current state. This process is performed by the block 60-1. In so doing, the engine output upper limit Pengmax and the engine output lower limit Pengmin in the map or conversion table may be set to define a range in which the energy efficiency of the engine 50 is satisfactory. This can bring about an energy saving effect for the engine 50.

In step S2, then, the battery output upper limit Pbatmax1 and the battery output lower limit Pbatmin1 are determined from the current battery voltage Vact. This process is performed by the blocks 60-2 through 60-6.

Further, the block 60-2 calculates the current state of charge SOCact from the current battery voltage Vact. The block 60-3 uses the map or conversion table and the current state of charge SOCact to determine the battery output upper limit Pbatmax11 and battery output lower limit Pbatmin11 under the condition in which the charge current and discharge current are fixedly set to their maximum values. Concurrently with this, the block 60-4 uses the map or conversion table and the current state of charge SOCact to determine the battery output upper limit Pbatmax12 and battery output lower limit Pbatmin12 that prevent the state of charge SOC from dropping below the SOC lower limit or rising above the SOC upper limit. The block 60-5 then determines the battery output upper limit Pbatmax1 that is the smaller of the battery output upper limit Pbatmax11 or the battery output upper limit Pbatmax12. The battery output upper limit Pbatmax1 indicates the maximum discharge electric power, and the battery output lower limit Pbatmin1 indicates the maximum charge electric power. Further, the block 60-6 determines the battery output lower limit Pbatmin1 that is the larger of the battery output lower limit Pbatmin11 or the battery output lower limit Pbatmin12.

As described above, the battery output upper limit Pbatmax1 and the battery output lower limit Pbatmin1 are determined in step S2. After this, in step S3, the battery output target value Pbattgt is determined from the current state of charge SOCact. This process is performed by the block 60-7.

In step S4, then, the electric load actual output Pelcout is determined based on the required output limits of the engine 50 and the battery 58. This process in step S4 is performed by the block 60-8 that is the drive distributing unit. This process will later be described. In subsequent step S5, the hydraulic load actual output Phydout is determined based on the required output limits of the engine 50 and the battery 58. This process in step S5 is performed by the block 60-8 that is the drive distributing unit. This process will later be described.

In step S6, then, the battery output Pbatout is determined based on the calculated outputs of the engine 50, the electric load 56, and the battery 58. The battery output Pbatout is the charge-discharge electric power of the battery 58. This process in step S6 is performed by the block 60-8 that is the drive distributing unit. This process will later be described.

In subsequent step S7, the assist motor output instruction Pasmref is determined based on the comparison of the electric load actual output Pelcout and the battery output Pbatout. This process in step S6 is performed by the block 60-8 that is the drive distributing unit. This process will later be described.

With the completion of the process performed in, step S7, the process by the control unit 60 comes to an end. The process performed by the control unit 60 described above determines the hydraulic load actual output Phydout, the electric load actual output Pelcout, and the assist motor output instruction Pasmref.

Figure 7:
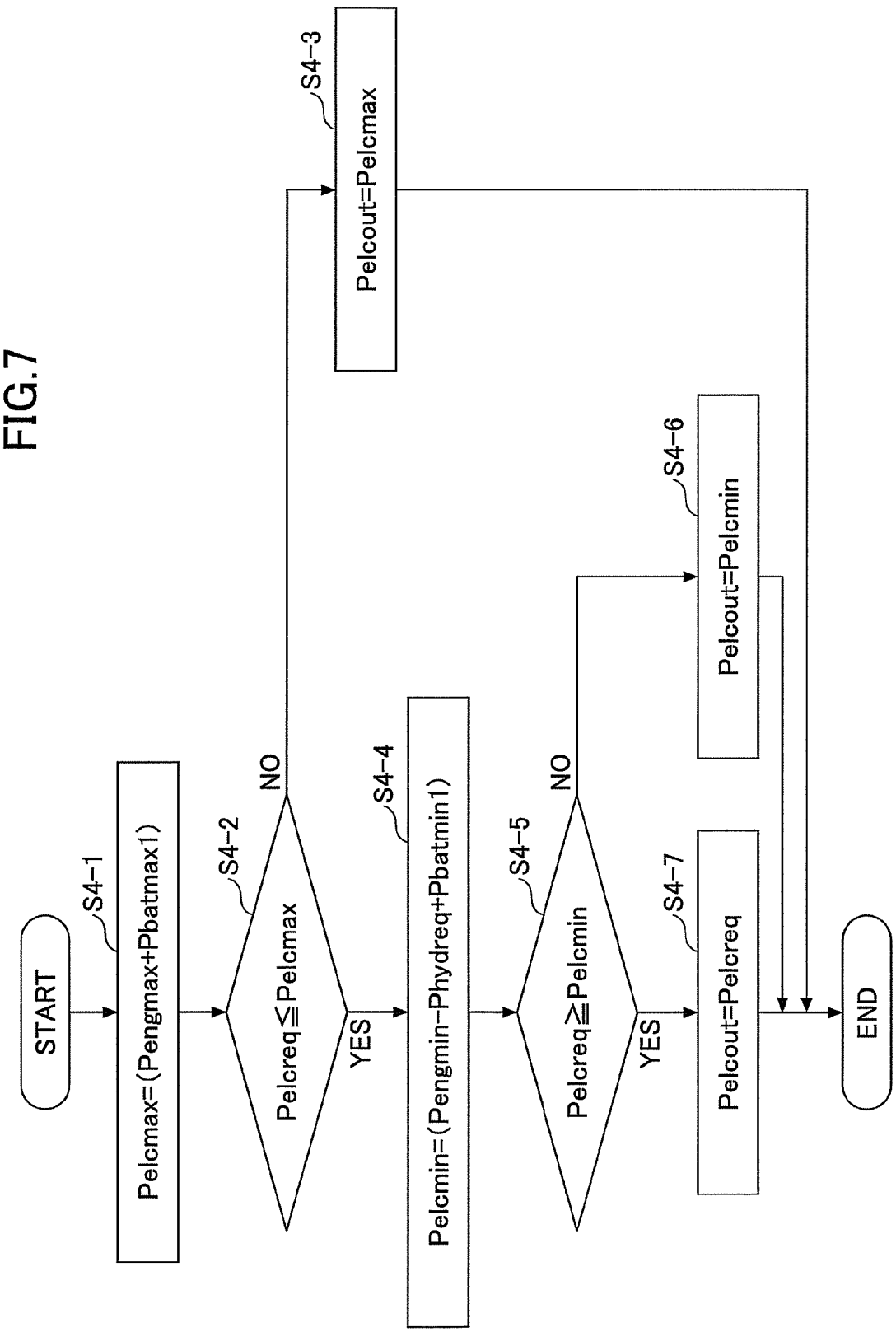
FIG. 7 is a flowchart of the process performed in step S4 illustrated in FIG. 6.

In the following, the detail of the process in step S4 will be described. FIG. 7 is a flowchart of the process performed in step S4.

Figure 8:
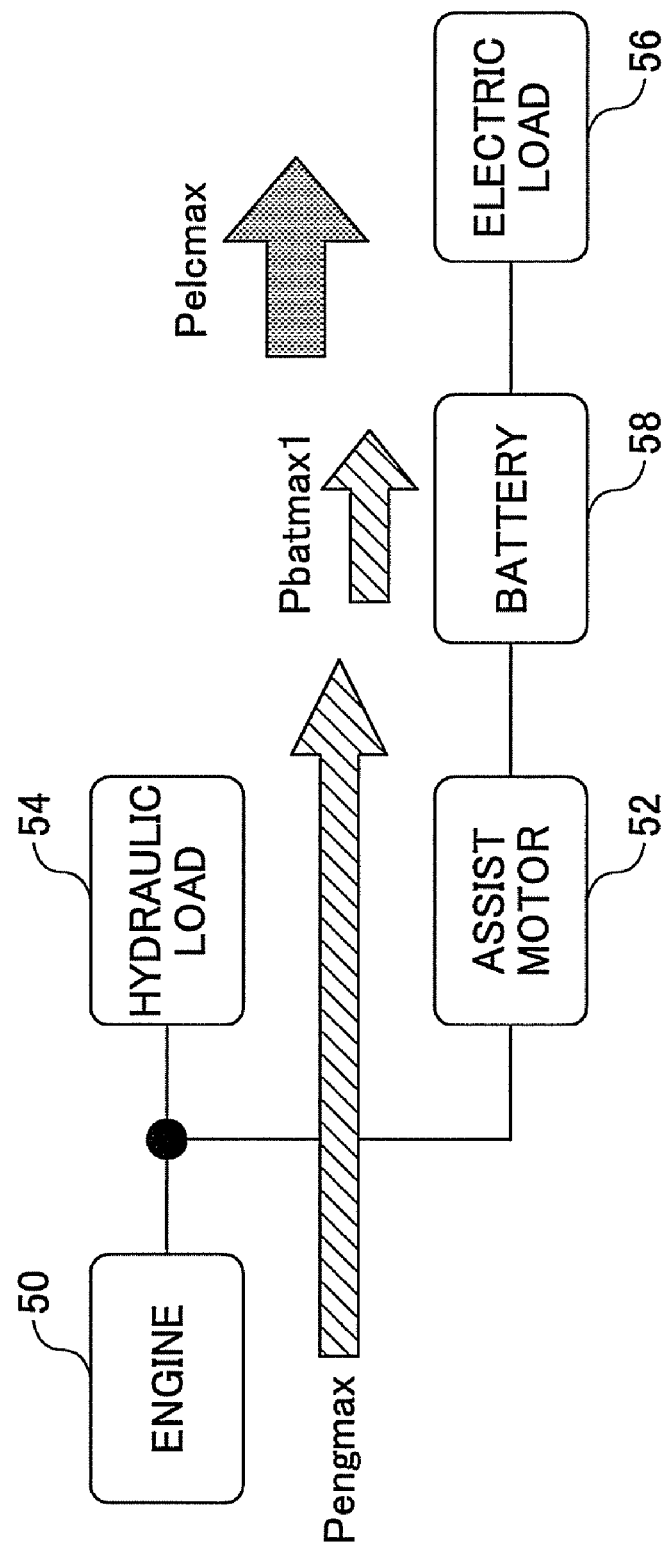
FIG. 8 is a drawing illustrating a model for calculating an electric load output upper limit Pelcmax.

In step S4-1, an electric load output upper limit Pelcmax that is the maximum electric power applicable to the electric load 56 is calculated. The electric load output upper limit Pelcmax is the maximum electric power that can be supplied to the electric load 56 during its power running operation. The electric power used at the time of a power running operation is set as a positive value. Since the hydraulic load 54 does not serve as the drive power source for the electric load 56, the hydraulic load required output Phydreq is not taken into account and set to zero. Accordingly, the electric load output upper limit Pelcmax is the sum of the engine output upper limit Pengmax and the battery output upper limit Pbatmax1. Namely, the electric power that can be supplied to the electric load 56 is the sum of the amount of power generated by the assist motor 52 at the maximum output of the engine 50 and the maximum discharge electric power of the battery. FIG. 8 is a drawing illustrating a model for calculating the electric load output upper limit Pelcmax.

In step S4-2, the electric load required output Pelcreq is compared with the electric load output upper limit Pelcmax to determine whether the electric load required output Pelcreq is no larger than the electric load output upper limit Pelcmax.

If it is ascertained in step S4-2 that the electric load required output Pelcreq is larger than the electric load output upper limit Pelcmax (No in step S4-2), the procedure proceeds to step S4-3. In step S4-3, the value of the electric load actual output Pelcout is set equal to the value of the electric load output upper limit Pelcmax. With this, the process comes to an end. Namely, if the electric power required by the electric load 56 is larger than the maximum electric power that can be supplied by the assist motor 52 and the battery 58, only the electric power that can be supplied by the assist motor 52 and the battery 58 is supplied to the electric load 56. In this manner, an upper limit is placed on the electric power supplied to the electric load.

Figure 9:
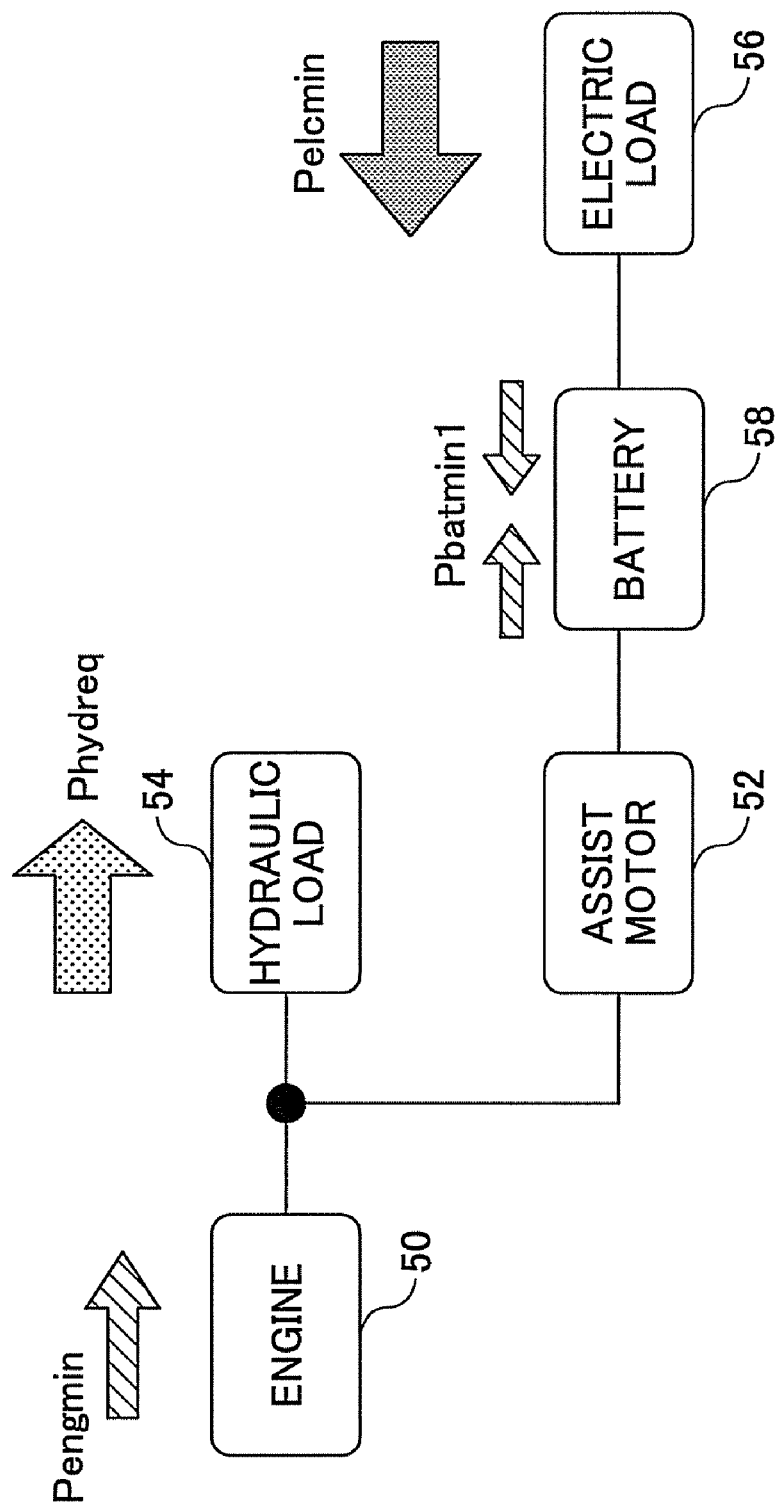
FIG. 9 is a drawing illustrating a model for calculating an electric load output lower limit Pelcmine.

If it is ascertained in step S4-2 that the electric load required output Pelcreq is no larger than the electric load output upper limit Pelcmax (Yes in step S4-2), the procedure proceeds to step S4-4. In step S4-4, the maximum electric power from the electric load 56 during its regenerative operation is calculated. Since electric power during the regenerative operation of the electric load 56 has a negative value, the maximum electric power at the time of regenerative operation is calculated as an electric load output lower limit Pelcmin. The electric load output lower limit Pelcmin is derived by subtracting the hydraulic load required output Phydreq from the engine output lower limit Pengmin and then adding the battery output lower limit Pbatmin11 to the result of subtraction. FIG. 9 is a drawing illustrating a model for calculating the electric load output lower limit Pelcmin.

In step S4-5, then, the electric load required output Pelcreq is compared with the electric load output lower limit Pelcmin to determine whether the electric load required output Pelcreq is no smaller than the electric load output lower limit Pelcmin.

If it is ascertained in step S4-5 that the electric load required output Pelcreq is smaller than the electric load output lower limit Pelcmin (No in step S4-5), the procedure proceeds to step S4-6. In step S4-6, the value of the electric load actual output Pelcout is set equal to the value of the electric load output lower limit Pelcmin. With this, the process comes to an end. Namely, when the electric power regenerated by the electric load 56 is larger than the sum of the maximum electric power consumable by the assist motor 52 and the maximum electric power chargeable in the battery 58, an upper limit is placed such that the electric power regenerated by the electric load 56 does not become larger than the sum of the maximum electric power consumable by the assist motor 52 and the maximum electric power chargeable in the battery 58

If it is ascertained in step S4-5 that the electric load required output Pelcreq is no smaller than the electric load output lower limit Pelcmin (Yes in step S4-5), the procedure proceeds to step S4-7. In step S4-7, the value of the electric load actual output Pelcout is set equal to the value of the electric load required output Pelcreq. With this, the process comes to an end. Namely, when the electric power regenerated by the electric load 56 is no larger than the sum of the maximum electric power consumable by the assist motor 52 and the maximum electric power chargeable in the battery 58, the electric power regenerated by the electric load 56 is output as it is. In this manner, the electric load actual output Pelcout is calculated by taking into account the engine output upper and lower limits Pengmax and Pengmin and the battery output upper and lower limits Pbatmax and Pbatmin, so that the electric load 56 is controlled in a stable manner.

Figure 10:
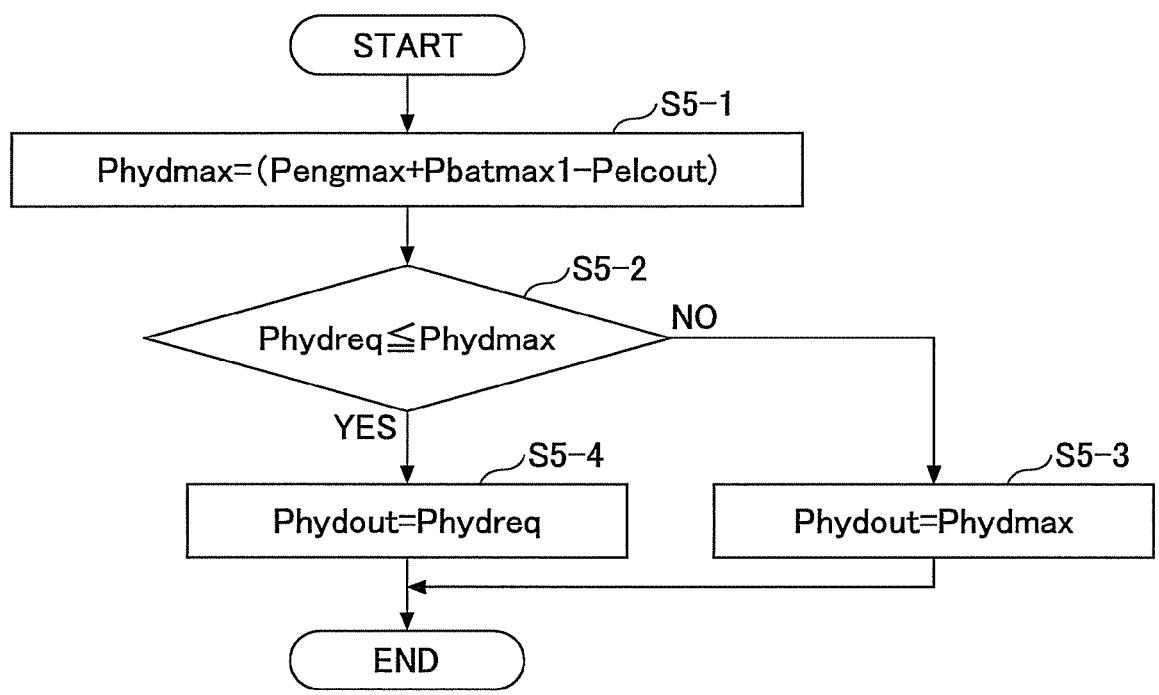
FIG. 10 is a flowchart of the process performed in step S5 illustrated in FIG. 6.

In the following, the details of the process in step S5 will be described. FIG. 10 is a flowchart of the process performed in step S5.

Figure 11:
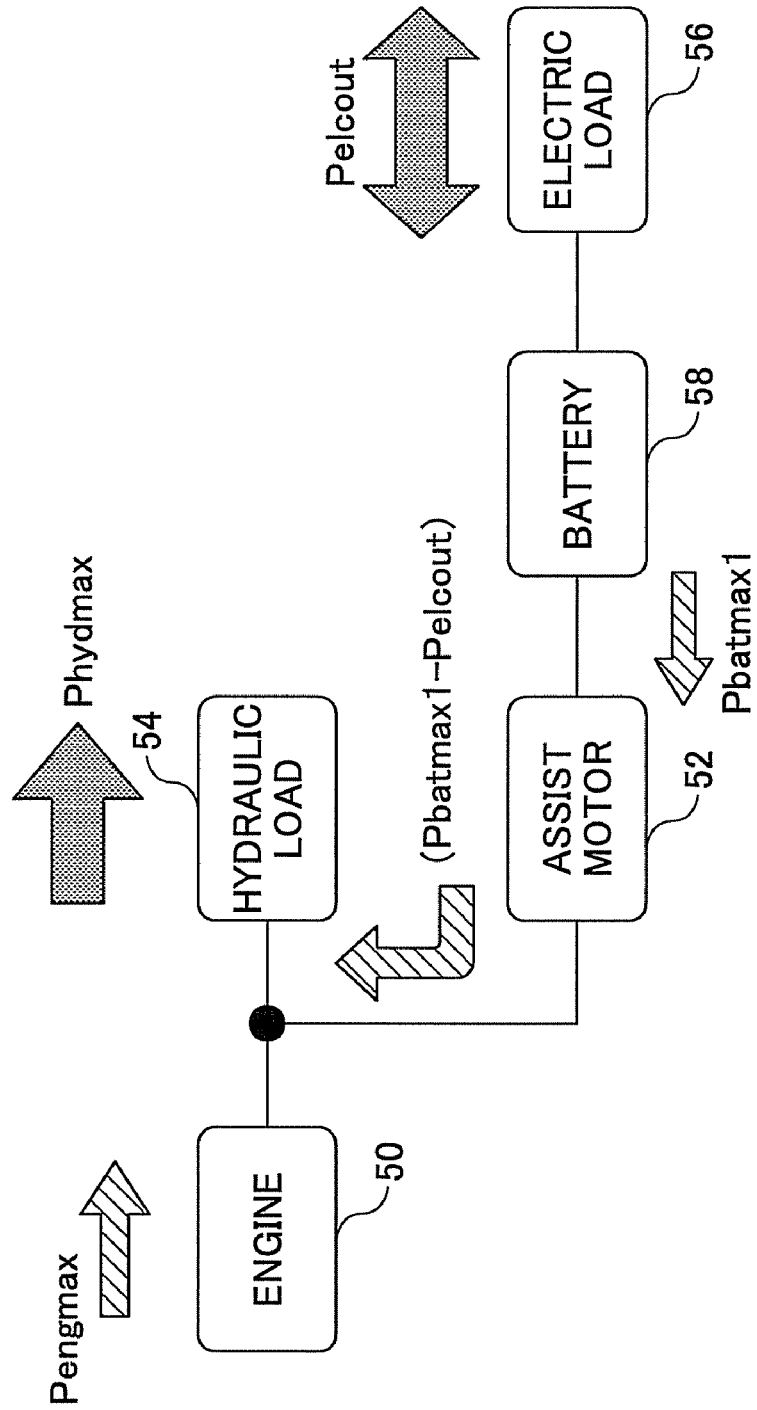
FIG. 11 is a drawing illustrating a model for calculating a hydraulic load output upper limit Phydmax.

In step S5-1, a hydraulic load output upper limit Phydmax that is the maximum drive power applicable to the hydraulic load 54 is calculated. The hydraulic load output upper limit Phydmax is derived by adding the battery output upper limit Pbatmax11 to the engine output upper limit Pengmax and then subtracting the electric load actual output Pelcout from the result of addition. FIG. 11 is a drawing illustrating a model for calculating the hydraulic load output upper limit Phydmax. The electric load actual output Pelcout has polarity, and assumes a positive value or negative value similar to the values of the electric load output upper and lower limits Pelecmax and Pelecmin. A positive value of the electric load actual output Pelcout indicates that electric power is supplied to the electric load 56 for its power running operation. In this case, the drive power applicable to the hydraulic load 54 is obtained by subtracting the electric power supplied to the electric load 56. On the other hand, a negative value of the electric load actual output Pelcout indicates that regenerative electric power is supplied from the electric load 56 performing a regenerative operation. In this case, the drive power applicable to the hydraulic load 54 is obtained by adding the regenerative electric power supplied from the electric load 56. When a negative value of the electric load actual output Pelcout is subtracted, the subtraction of a negative value becomes equivalent to an addition of a positive value, so that the regenerative electric power is added.

In step S5-2, then, the hydraulic load required output Phydreq is compared with the hydraulic load output upper limit Phydmax to determine whether the hydraulic load required output Phydreq is no larger than the hydraulic load output upper limit Phydmax.

If it is ascertained in step S5-2 that the hydraulic load required output Phydreq is not no larger than the hydraulic load output upper limit Phydmax, i.e., that the hydraulic load required output Phydreq is larger than the hydraulic load output upper limit Phydmax (No in step S5-2), the procedure proceeds to step S5-3. In step S5-3, the value of the hydraulic load actual output Phydout is set equal to the value of the hydraulic load output upper limit Phydmax. With this, the process comes to an end. Namely, when the drive power required by the hydraulic load 54 is larger than the sum of the maximum drive power generable by the engine 50 and the maximum drive power generable by the assist motor 52, an upper limit is placed such that the drive power supplied to the hydraulic load 54 does not exceed the sum of the maximum drive power generable by the engine 50 and the maximum drive power generable by the assist motor 52.

If it is ascertained in step S5-2 that the hydraulic load required output Phydreq is no larger than the hydraulic load output upper limit Phydmax (Yes in step S5-2), the procedure proceeds to step S5-4. In step S5-4, the value of the hydraulic load output Phydout is set equal to the value of the hydraulic load required output Phydreq. With this, the process comes to an end. Namely, when the drive power required by the hydraulic load 54 is no larger than the sum of the maximum drive power generable by the engine 50 and the maximum drive power generable by the assist motor 52, the drive power required by the hydraulic load 54 is supplied as it is. In this manner, the hydraulic load actual output Phydout is calculated by taking into account the engine output upper limit Pengmax and the battery output upper limit Pbatmax1, so that the hydraulic load 54 is controlled in a stable manner.

Figure 12:
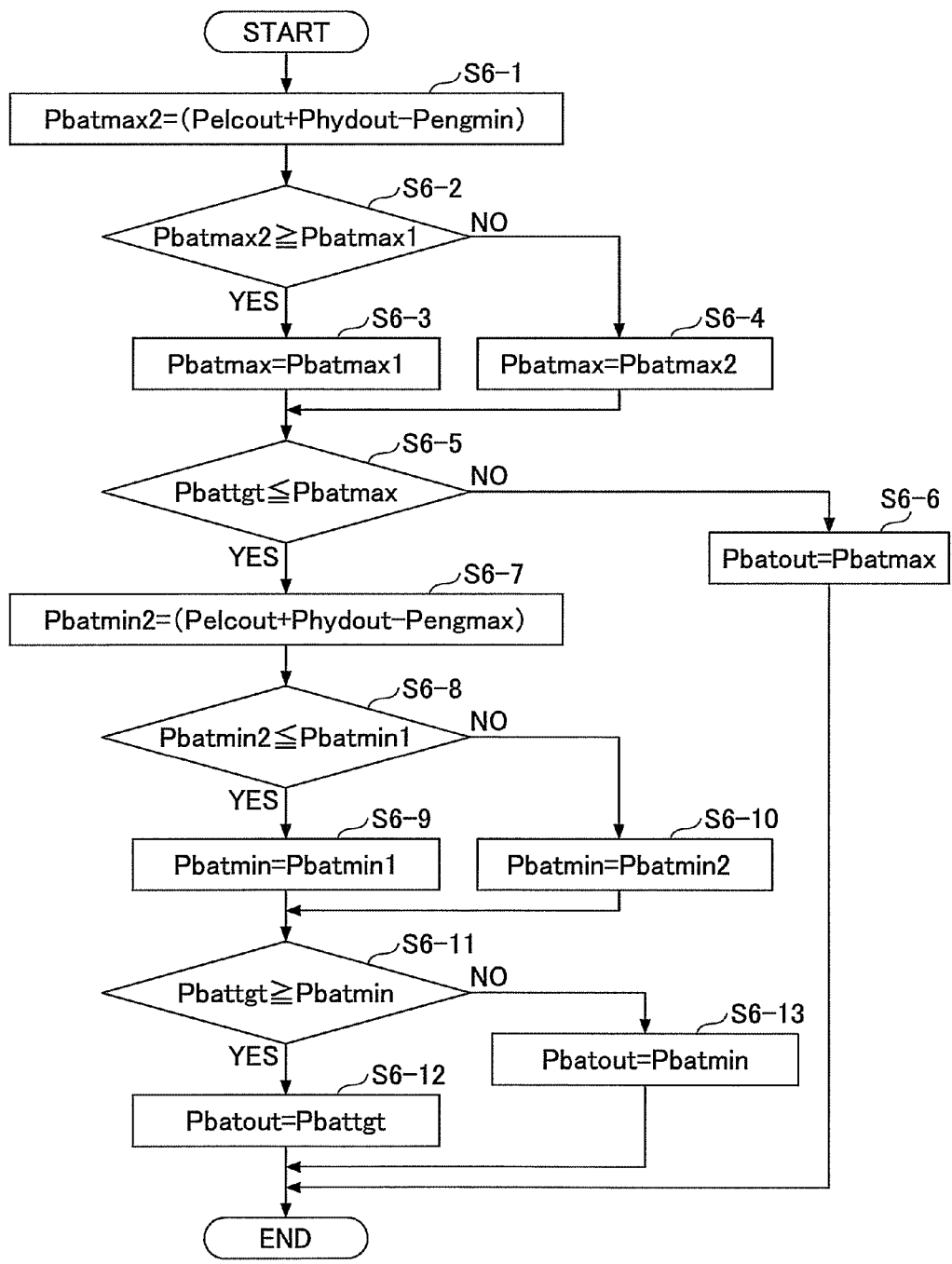
FIG. 12 is a flowchart of the process performed in step S6 illustrated in FIG. 6.

In the following, the detail of the process in step S6 will be described. FIG. 12 is a flowchart of the process performed in step S6. The battery output upper limit Pbatmax2 indicates the maximum discharge electric power, and the battery output lower limit Pbatmin2 indicates the maximum charge electric power.

Figure 13:
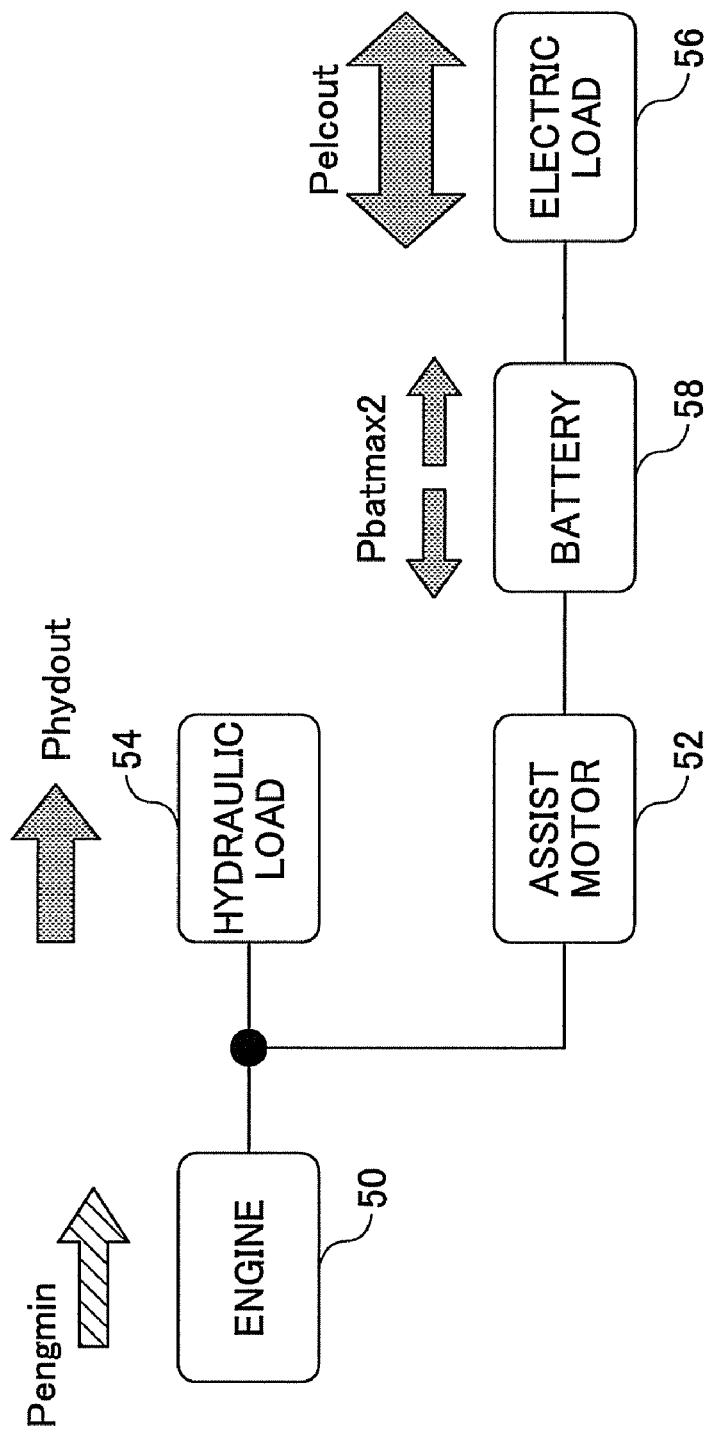
FIG. 13 is a drawing illustrating a model for calculating a battery control output upper limit Pbatmax2.

In step S6-1, a battery control output upper limit Pbatmax2 that is the electric power dischargeable by the battery 58 is calculated in the state in which the output to the electric load 56 and the output to the hydraulic load 54 are determined as described above. The battery control output upper limit Pbatmax2 is calculated by subtracting the engine output lower limit Pengmin from the sum of the electric load actual output Pelcout and the hydraulic load output Phydout. FIG. 13 is a drawing illustrating a model for calculating the battery control output upper limit Pbatmax2. The battery control output upper limit Pbatmax2 is equal to the sum of the electric power consumable by the electric load 56 and the electric power consumable by the assist motor 52 for assisting the hydraulic system.

In step S6-2, then, the battery output upper limit Pbatmax1 determined in step S2 is compared with the battery control output upper limit Pbatmax2 to determine whether the battery control output upper limit Pbatmax2 is no smaller than the battery output upper limit Pbatmax1.

If it is ascertained in step S6-2 that the battery control output upper limit Pbatmax2 is no smaller than the battery output upper limit Pbatmax1 (Yes in step S6-2), the procedure proceeds to step S6-3. In step S6-3, the value of the battery output upper limit Pbatmax is set equal to the value of the battery output upper limit Pbatmax1. The procedure thereafter proceeds to step S6-5.

If it is ascertained in step S6-2 that the battery control output upper limit Pbatmax2 is not no smaller than the battery output upper limit Pbatmax1, i.e., that the battery control output upper limit Pbatmax2 is smaller than the battery output upper limit Pbatmax1 (No in step S6-2), the procedure proceeds to step S6-4. In step S6-4, the value of the battery output upper limit Pbatmax is set equal to the value of the battery control output upper limit Pbatmax2. The procedure thereafter proceeds to step S6-5.

In step S6-5, the battery output target value Pbattgt is compared with the battery output upper limit Pbatmax to determine whether the battery output target value Pbattgt is no larger than the battery output upper limit Pbatmax.

If it is ascertained in step S6-5 that the battery output target value Pbattgt is not no larger than the battery output upper limit Pbatmax, i.e., that the battery output target value Pbattgt is larger than the battery output upper limit Pbatmax (No in step S6-5), the procedure proceeds to step S6-6. In step S6-6, the value of the battery output Pbatout is set equal to the value of the battery output upper limit Pbatmax. With this, the process comes to an end.

In this manner, the battery output upper and lower limits Pbatmax2 and Pbatmin2 are obtained based on the electric load actual output Pelcout and the hydraulic load actual output Phydout. With this arrangement, the maximum output value (i.e., charge and discharge electric power) of the battery 58 is obtained in response to the actual load requirements. The charging and discharging of the battery 58 can thus be performed in response to the conditions of actual operations.

Further, the battery required limits are obtained by comparing the battery output upper and lower limits obtained based on the electric load actual output Pelcout and the hydraulic load actual output Phydout with the maximum chargeable and dischargeable electric power responsive to the current charge state of the battery 58. This arrangement makes it possible to avoid an excessive load on the battery 58.

Further, the battery required limits and the battery target output are compared such that the battery output Pbatout of the battery 58 falls within the range of the battery required limits. The battery target output is corrected if the battery target output is outside the range of the battery required limits. This arrangement makes it possible to avoid an excessive load on the battery 58 in a more reliable manner.

Figure 14:
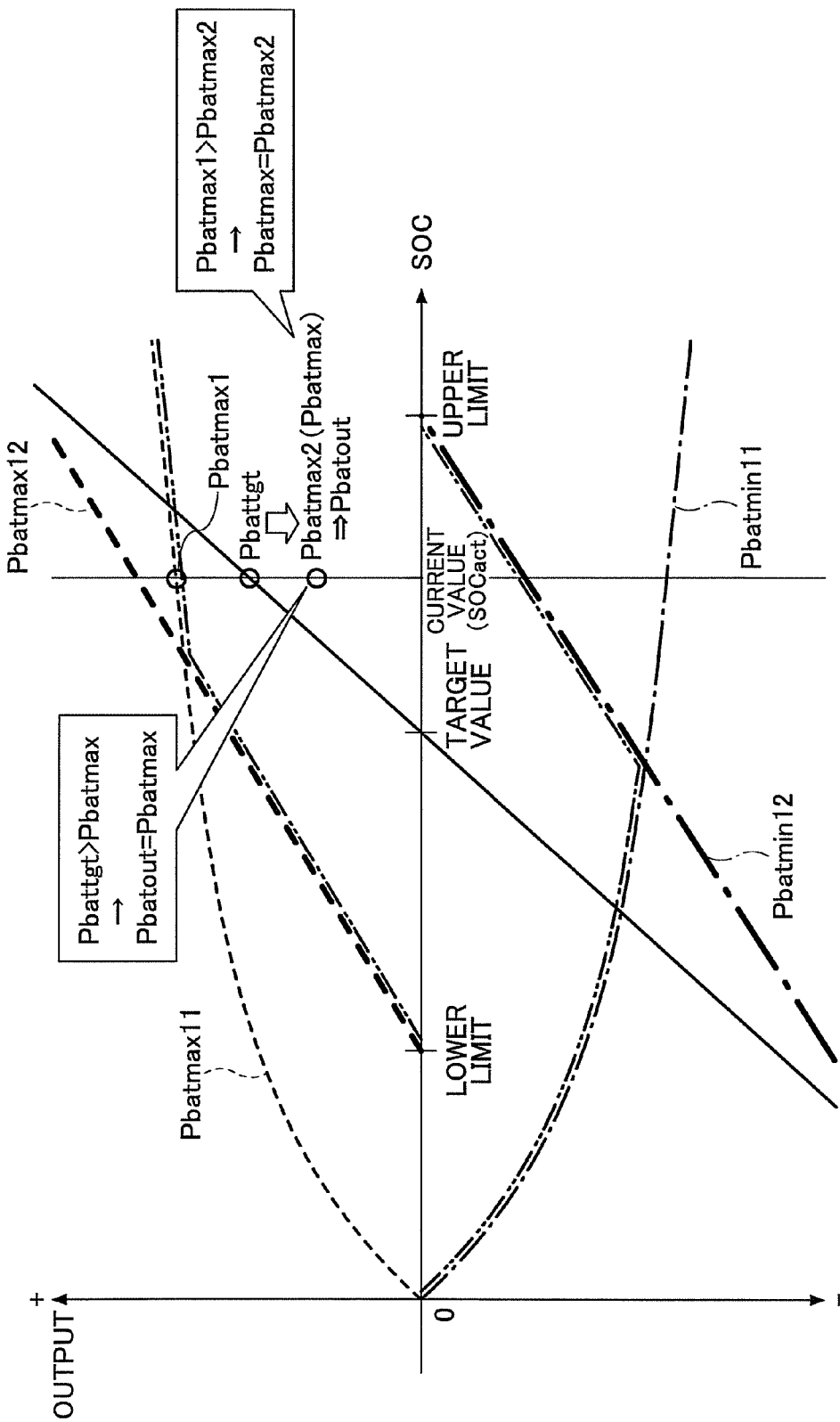
FIG. 14 is a drawing illustrating the value of a battery output Pbatout in a graph chart indicative of the relationship between the state of charge (SOC) of a battery and a battery output.

FIG. 14 is a drawing illustrating the value of the battery output Pbatout determined by the process in step S6-6 as placed in a graph chart indicative of the relationship between the state of charge (SOC) of the battery and the battery output. In the graph chart of FIG. 14, the battery output upper limit Pbatmax1 determined by the block 60-5 illustrated in FIG. 5 is illustrated. The battery output upper limit Pbatmax1 is the smaller of the battery output upper limit Pbatmax11 or the battery output upper limit Pbatmax12, and corresponds to two-dot chain lines illustrated in the figure. In the graph chart of FIG. 14, Pbatmin1 determined by the block 60-6 illustrated in FIG. 5 is also illustrated. The battery output lower limit Pbatmin1 is the larger (i.e., the one that is closer to zero) of the battery output lower limit Pbatmin11 or the battery output lower limit Pbatmin12, and corresponds to two-dot chain lines illustrated in the figure.

The actual battery output Pbatout is determined on the positive side indicative of discharging such as to fall within the area below the two-dot chain lines indicative of Pbatmax1. Further, the actual battery output Pbatout is determined on the negative side indicative of charging such as to fall within the area above the two-dot chain lines indicative of Pbatmin1.

In the graph chart of FIG. 14, the battery output target value Pbattgt referred to by the block 60-7 is also illustrated. In the present embodiment, the actual discharge electric power or charge electric power of the battery 58 is determined as the battery output Pbatout by taking into account the current state of charge SOCact of the battery 58 in addition to the battery output upper limit Pbatmax1 set as the maximum dischargeable value of the battery 58 and the battery output lower limit Pbatmin1 set as the maximum chargeable value of the battery 58.

In the process of step S6-6, as illustrated in FIG. 14, the battery output target value Pbattgt at the current state of charge SOCact of the battery 58 is larger than the battery output control upper limit Pbatmax. Namely, the target discharge electric power exceeds the upper limit of discharge electric power. In this case, the battery target output Pbattgt should not be set as the battery output Pbatout. Accordingly, the actual battery output Pbatout is set equal to the battery output control upper limit Pbatmax. In step S6-2 and step S6-4 described above, the battery control output upper limit Pbatmax2 is smaller than the battery output upper limit Pbatmax1, so that the value of the battery output upper limit Pbatmax has been set equal to the value of the battery control output upper limit Pbatmax2. In the example illustrated in FIG. 14, thus, the actual battery output Pbatout ends up being set equal to the value of the battery output upper limit Pbatmax, i.e., the value of the battery control output upper limit Pbatmax2. Namely, the battery required limits are calculated based on the outputs of the engine 50, the electric load 56, and the battery 58. The battery target output Pbattgt is then compared with the calculated battery required limit, and is replaced by the battery supply limit in the case illustrated in FIG. 14. In so doing, comparison is made with the limit value of the battery 58 corresponding to SOC such as to avoid exceeding the output capacity of the battery 58. This prevents a target value exceeding the capacity of the battery 58 from being calculated.

Figure 15:
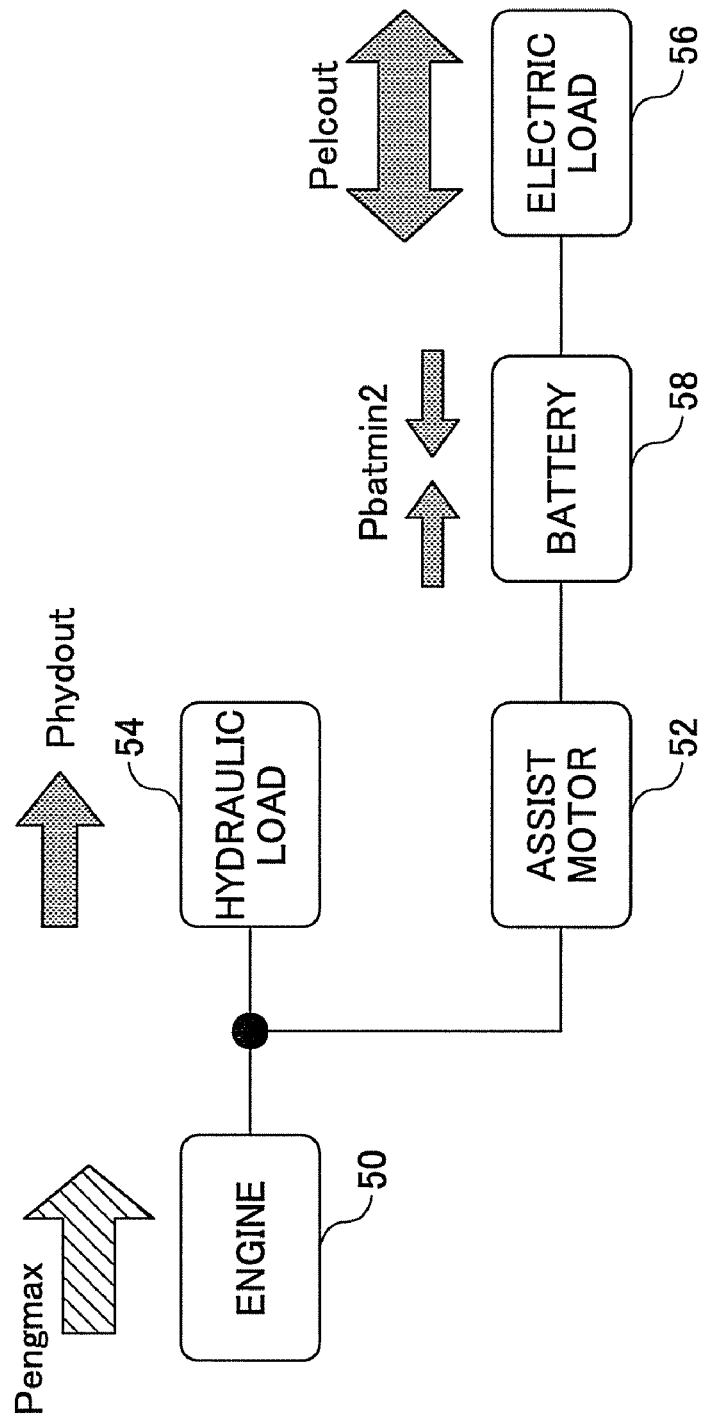
FIG. 15 is a drawing illustrating a model for calculating a battery control output lower limit Pbatmin2.

If it is ascertained in step S6-5 that the battery output target value Pbattgt is no larger than the battery output upper limit Pbatmax (Yes in step S6-5), the procedure proceeds to step S6-7. In step S6-7, a battery control output lower limit Pbatmin2 that is the electric power chargeable to the battery 58 is calculated in the state in which the output to the electric load 56 and the output to the hydraulic load 54 are determined as described above. The battery control output lower limit Pbatmin2 is calculated by subtracting the engine output upper limit Pengmax from the sum of the electric load actual output Pelcout and the hydraulic load output Phydout. FIG. 15 is a drawing illustrating a model for calculating the battery control output lower limit Pbatmin2. The battery control output lower limit Pbatmin2 is the sum of the electric power regenerated by the electric load 56 and the electric power generated by the assist motor 52.

In step S6-8, then, the battery output lower limit Pbatmin1 is compared with the battery control output lower limit Pbatmin2 to determine whether the battery control output lower limit Pbatmin2 is no larger than the battery output lower limit Pbatmin1.

If it is ascertained in step S6-8 that the battery control output lower limit Pbatmin2 is no larger than the battery output lower limit Pbatmin1 (Yes in step S6-8), the procedure proceeds to step S6-9. In step S6-9, the value of the battery output lower limit Pbatmin is set equal to the value of the battery output lower limit Pbatmin1. The procedure thereafter proceeds to step S6-11.

If it is ascertained in step S6-8 that the battery control output lower limit Pbatmin2 is not no larger than the battery output lower limit Pbatmin1, i.e., that the battery control output lower limit Pbatmin2 is larger than the battery output lower limit Pbatmin1 (No in step S6-8), the procedure proceeds to step S6-10. In step S6-10, the value of the battery output lower limit Pbatmin is set equal to the value of the battery control output lower limit Pbatmin2. The procedure thereafter proceeds to step S6-11.

In step S6-11, the battery output target value Pbattgt is compared with the battery output lower limit Pbatmin to determine whether the battery output target value Pbattgt is no smaller than the battery output lower limit Pbatmin.

Figure 16:
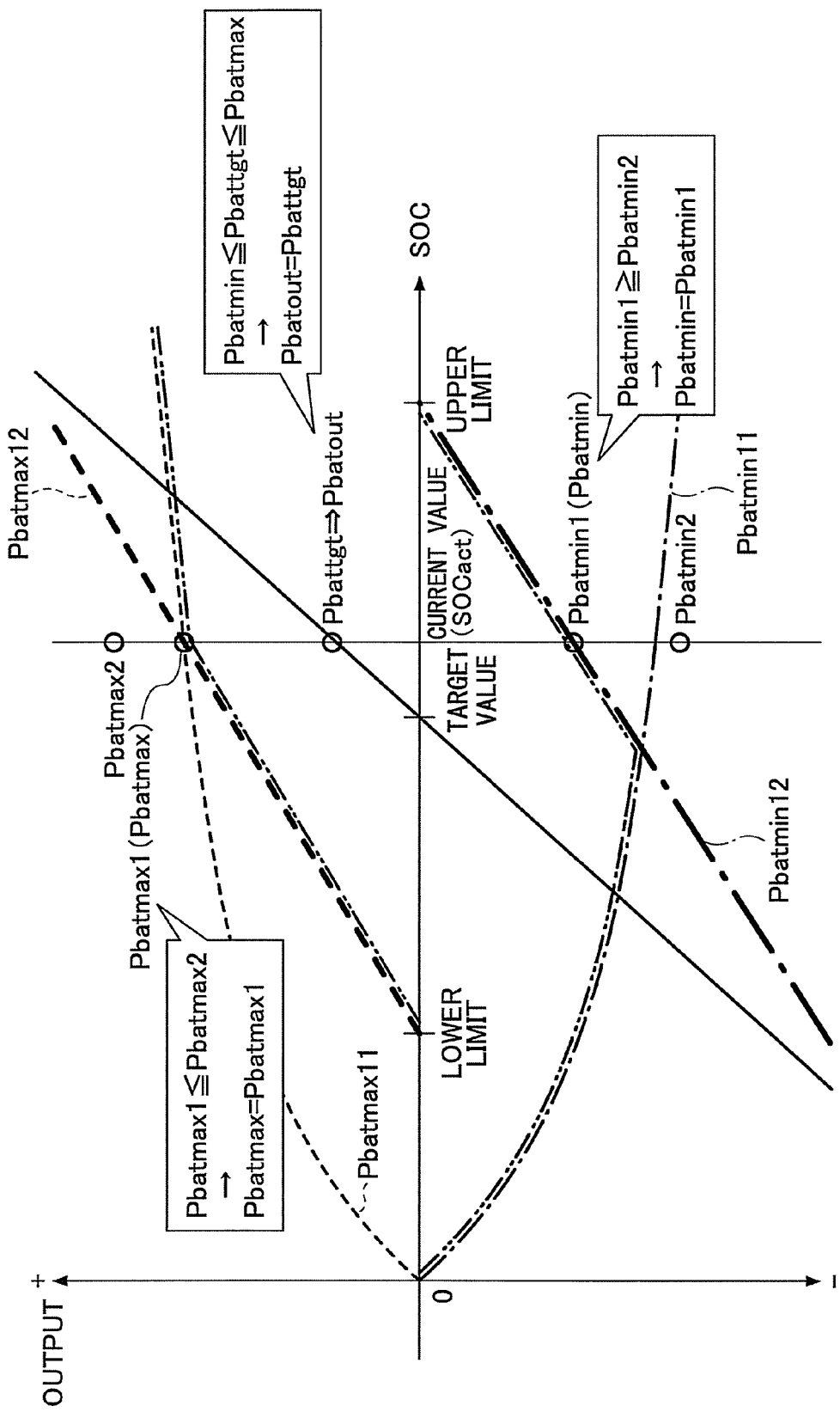
FIG. 16 is a drawing illustrating the value of a battery output Pbatout in a graph chart indicative of the relationship between the state of charge (SOC) of a battery and a battery output.

If it is ascertained in step S6-11 that the battery output target value Pbattgt is no smaller than the battery output lower limit Pbatmin (Yes in step S6-11), the procedure proceeds to step S6-12. In step S6-12, the value of the battery output Pbatout is set equal to the value of the battery target output Pbattgt. With this, the process comes to an end. FIG. 16 is a drawing illustrating the value of the battery output Pbatout determined by the process in step S6-12 as placed in a graph chart indicative of the relationship between the state of charge (SOC) of the battery and the battery output.

In the example illustrated in FIG. 16, the battery output upper limit Pbatmax1 is no larger than the battery control output upper limit Pbatmax2, so that the value of the battery control output upper limit Pbatmax1 has been set as the value of the battery output upper limit Pbatmax in the processes of step S6-2 and step S6-3. Further, the battery control output lower limit Pbatmin2 is no larger than the battery output lower limit Pbatmin1, so that the value of the battery output lower limit Pbatmin1 has been set as the value of the battery output lower limit Pbatmin in the processes of step S6-8 and step S6-9. Here, the battery output target value Pbattgt at the current state of charge SOCact of the battery 58 is no smaller than the battery output lower limit Pbatmin and no larger than the battery output upper limit Pbatmax. Because of this, the battery output target value Pbattgt may be set as the actual battery output Pbatout. In the process of step S6-12, thus, the value of the battery output target value Pbattgt is set as the battery output Pbatout.

Figure 17:
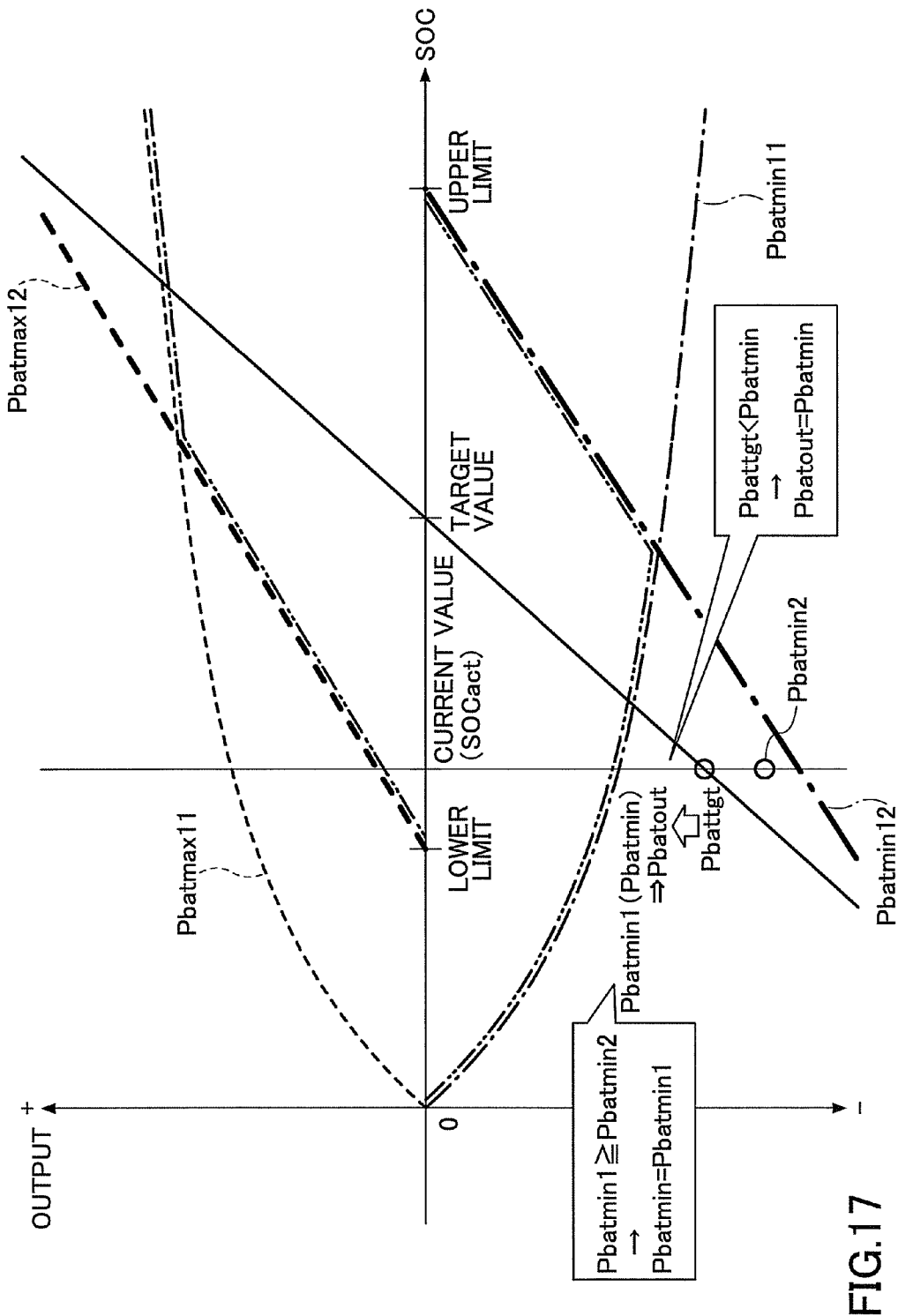
FIG. 17 is a drawing illustrating the value of a battery output Pbatout in a graph chart indicative of the relationship between the state of charge (SOC) of a battery and a battery output.

If it is ascertained in step S6-11 that the battery output target value Pbattgt is not no smaller than the battery output lower limit Pbatmin, i.e., that the battery output target value Pbattgt is smaller than the battery output lower limit Pbatmin (No in step S6-11), the procedure proceeds to step S6-13. In step S6-13, the value of the battery output Pbatout is set equal to the value of the battery output lower limit Pbatmin. With this, the process comes to an end. FIG. 17 is a drawing illustrating the value of the battery output Pbatout determined by the process in step S6-12 as placed in a graph chart indicative of the relationship between the state of charge (SOC) of the battery and the battery output.

In the example illustrated in FIG. 17, the battery control output lower limit Pbatmin2 is no larger than the battery output lower limit Pbatmin1, so that the value of the battery output lower limit Pbatmin1 has been set as the value of the battery output lower limit Pbatmin in the processes of step S6-8 and step S6-9. Here, the battery output target value Pbattgt at the current state of charge SOCact of the battery 58 is smaller than the battery output lower limit Pbatmin. Since the target charge electric power exceeds the maximum charge electric power of the battery, the battery output target value Pbattgt should not be set as the actual battery output Pbatout. In the process of step S6-13, thus, the value of the battery output lower limit Pbatmin, i.e., the value of the battery output lower limit Pbatmin1, is set as the battery output Pbatout.

In this manner, the battery output upper and lower limits Pbatmax2 and Pbatmin2 are obtained based on the electric load actual output Pelcout and the hydraulic load actual output Phydout. With this arrangement, the maximum output value (i.e., charge and discharge electric power) of the battery 58 is obtained in response to the actual load requirements. The charging and discharging of the battery 58 can thus be performed in response to the conditions of actual operations.

Further, the battery required limits are obtained by comparing the battery output upper and lower limits obtained based on the electric load actual output Pelcout and the hydraulic load actual output Phydout with the maximum chargeable and dischargeable electric power responsive to the current charge state of the battery 58. This arrangement makes it possible to avoid an excessive load on the battery 58.

Further, the battery required limits and the battery target output are compared such that the battery output Pbatout of the battery 58 falls within the range of the battery required limits. The battery target output is corrected if the battery target output is outside the range of the battery required limits. This arrangement makes it possible to avoid an excessive load on the battery 58 in a more reliable manner.

Figure 18:
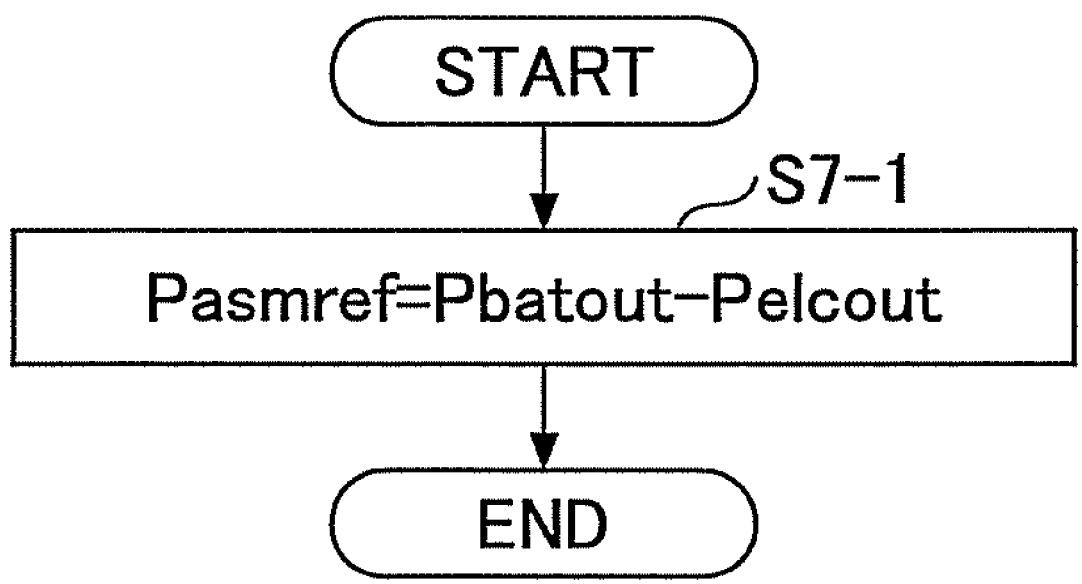
FIG. 18 is a flowchart of the process performed in step S7 illustrated in FIG. 6.

In the following, the detail of the process in step S7 will be described. FIG. 18 is a flowchart of the process performed in step S7.

Upon start of the process, in step S7-1, the assist motor output instruction Pasmref for indicating the operation of the assist motor 52 is calculated. With this, the process comes to an end. The assist motor output instruction Pasmref is calculated by subtracting the electric load actual output Pelcout from the battery output Pbatout. In this manner, the assist motor output instruction is obtained by comparing the battery output with the electric load actual output. With this arrangement, the electric motor operation and power generator operation of the assist motor 52 are controlled in response to the state of charge of the battery 58 as well as the driving states of the hybrid-type construction machine. Consequently, the hybrid-type construction machine can be continuously operated in a stable manner.

Figure 19:
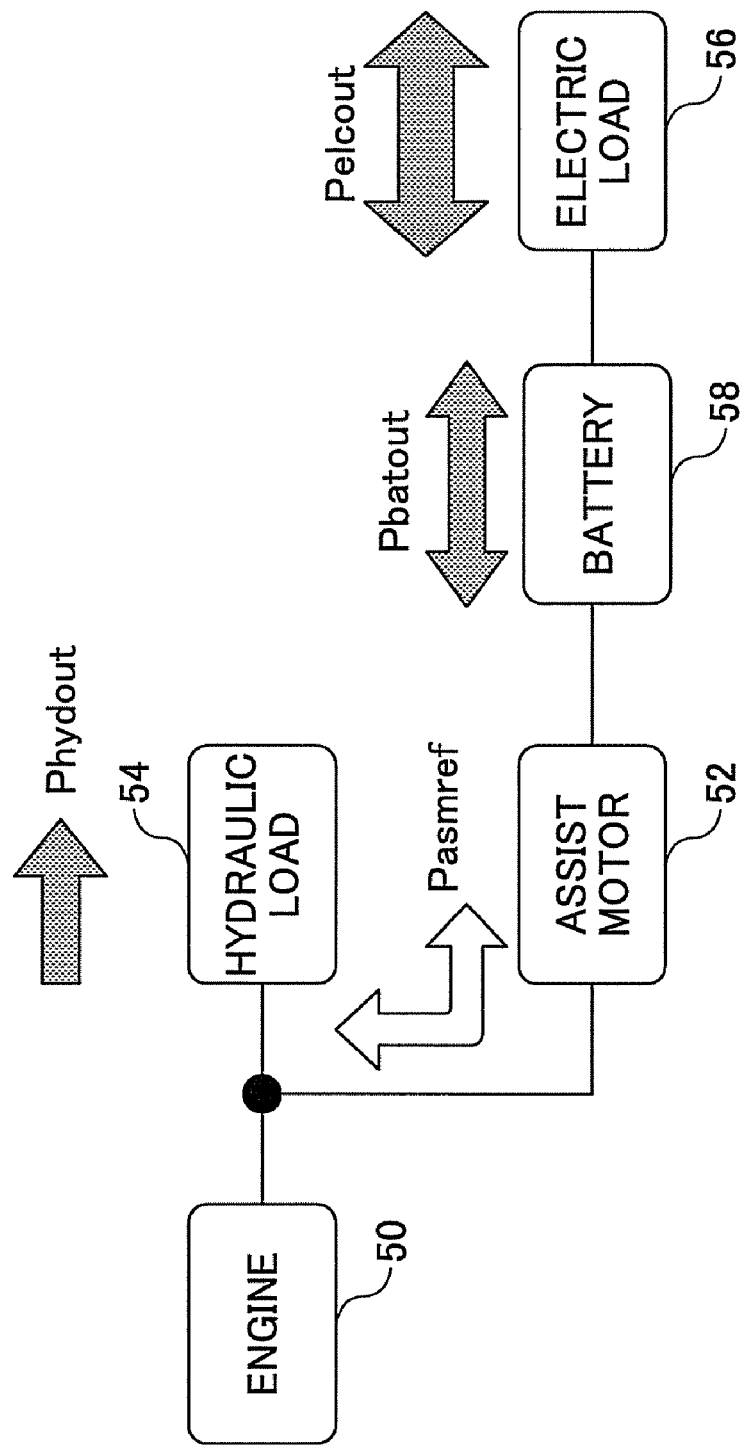
FIG. 19 is a drawing illustrating a model for calculating an assist motor output instruction Pasmref.

FIG. 19 is a drawing illustrating a model for calculating the assist motor output instruction Pasmref. The output of the assist motor 52 corresponds to the electric power obtained by subtracting the electric power consumed by the electric load 56 from the electric power discharged from the battery 58.

The output of the electric load 56 has polarity, which is positive when the electric load 56 actually consumes electric power. In this case, electric power is supplied to the assist motor 52 functioning as an electric motor if the value obtained by subtracting the electric load output consumed by the electric load 56 from the electric power discharged from the battery 58 is positive. On the other hand, drive power is supplied from the engine 50 to the assist motor 52 functioning as a power generator if the value obtained by subtracting the electric load output consumed by the electric load 56 from the electric power discharged from the battery 58 is negative. With this arrangement, the assist motor 52 generates electric power equal in amount to the shortage, and the generated electric power is supplied to the electric load 56.

When the electric load 56 generates regenerative electric power, the output polarity of the electric load 56 is negative. In this case, a negative value is subtracted, so that the electric power regenerated by the electric load 56 is added to the electric power discharged from the battery 58. Accordingly, the sum of the electric power discharged by the battery 58 and the electric power regenerated by the electric load 56 is supplied to the assist motor 52. The assist motor 52 thus operates as an electric motor to assist the engine 50. In the manner as described above, the assist motor 52 is controlled based on the comparison of electrical values between the electric load actual output Pelcout serving an output setting of the electrical drive unit and the battery output Pbatout serving as an output setting of the electrical storage device.

As described above, the hybrid-type power shovel that is an example of the hybrid-type construction machine to which the present embodiment is applied includes an oil pressure generating unit, a motor generator, an electric storage device, an electric drive unit, and a control unit. The oil pressure generating unit corresponds to the main pump 14 that is a hydraulic motor, and converts the output of the engine 50 into oil pressure for provision to the hydraulic drive unit. The motor generator 12 corresponds to the assist motor 52, which is connected to the engine 50 to function as both an electric motor and a power generator. The electric storage device corresponds to the battery 19 (or 58), which supplies electric power to the motor generator 12 to make it function as an electric motor. The electric drive unit is driven by electric power supplied from the electric storage device and the motor generator. The electric drive unit generates regenerative electric power for provision to at least one of the electric storage device and the motor generator. The control unit 60 controls the operation of the motor generator 12. In the hybrid-type construction machine described above, the control unit 60 includes the drive distributing unit 60-8 for controlling the operation and output of the motor generator 12. The drive distributing unit 60-8 generates and outputs an output instruction (i.e., assist motor output instruction Pasmref) for controlling the operation and output of the motor generator 12 based on an output setting of the electric storage device (i.e., battery output upper limit Pbatmax1 and battery output lower limit Pbatmin1) determined from the state of charge SOC of the electric storage device, an output setting of the engine (i.e., engine output upper limit Pengmax and engine output lower limit Pengmin) determined from the number of revolutions of the engine, a hydraulic load required value (i.e., hydraulic load required output Phydreq) indicative of the drive power required by the oil pressure generating unit, and an electric load required value (i.e., electric load required output Pelcreq) indicative of the electric power required by the electric drive unit.

The drive distributing unit 60-8 determines electric power supplied to the electric drive unit, which is output as an electric load actual output value (i.e., electric load actual output Pelcout). Further, the drive distributing unit 60-8 determines an output applied to the hydraulic drive unit, which is output as a hydraulic load actual output value (i.e., hydraulic load actual output Phydout). Moreover, the drive distributing unit 60-8 determines an output instruction (i.e., assist motor output instruction Pasmref) based on the state of charge SOC of the electric storage device.

According to the present embodiment, the operation and output of a motor generator are controlled based on the output setting of the electric storage device, the electric load required value, the output setting of the engine, and the hydraulic load required value, so that the electric storage device and engine serving as power sources can be used in a proper output range. According to the present embodiment, further, the regenerative electric power from the electric load is efficiently utilized, and, also, the state of charge (SOC) of the electric storage device is efficiently maintained close to a target level. The present invention has been described with reference to a hybrid-type power shovel that is an example of a hybrid-type construction machine. The present embodiment is also applicable to other construction machines such as a track or wheel loader.

The present invention is not limited to the disclosed embodiments, but various variations and modifications may be made without departing from the scope of the present invention.

The present application is based on a priority-claimed Japanese Patent Application No. 2007-340836 filed on Dec. 28, 2007, the entire contents of which are hereby incorporated by reference.

The invention claimed is:

1. A hybrid-type construction machine, comprising:
an oil pressure generating unit to convert an output of an engine into oil pressure for provision to a hydraulic drive unit;
a motor generator connected to the engine to serve as both an electric motor and a power generator;

an electric storage device to supply electric power to the motor generator to cause the motor generator to function as an electric motor;

an electric drive unit driven by electric power supplied from the electric storage device and to generate regenerative electric power for provision to the electric storage device; and a control unit to control an operation of the motor generator, wherein the control unit includes:

an output condition calculating unit to calculate output conditions of the engine and the electric storage device; and a drive distributing unit to determine output values of the electric drive unit and the hydraulic drive unit based on the output conditions calculated by the output condition calculating unit.

2. The hybrid-type construction machine as claimed in claim 1, wherein the drive distributing unit generates and outputs an output instruction for controlling the operation and output of the motor generator based on settings including:

an output setting of the electric storage device determined from a state of charge of the electric storage device, an output setting of the engine determined from a number of revolutions of the engine, a hydraulic load required value indicative of drive power required by the oil pressure generating unit, and an electric load required value indicative of electric power required by the electric drive unit.

3. The hybrid-type construction machine as claimed in claim 1, wherein the drive distributing unit determines electric power for a power running operation of the electric drive unit and regenerative electric power generated by a regenerative operation of the electric drive unit based on output limits of the engine and the electric storage device.

4. The hybrid-type construction machine as claimed in claim 1, wherein the drive distributing unit determines an output supplied to the hydraulic drive unit based on output limits of the engine and the electric storage device.

5. The hybrid-type construction machine as claimed in claim 1, wherein an output instruction for the electric storage device is determined based on comparison between a battery target output and battery required limit values calculated based on outputs of the engine, the electric drive unit, and the electric storage device.

6. The hybrid-type construction machine as claimed in claim 5, wherein an output of the motor generator is determined based on comparison between the output instruction for the electric storage device and one of electric power supplied to the electric drive unit or electric power output from the electric drive unit.

* * * * *